(12) United States Patent
Muramoto et al.

(10) Patent No.: US 10,406,998 B2
(45) Date of Patent: Sep. 10, 2019

(54) SHEET FOR LICENSE PLATE, LAMINATE FOR LICENSE PLATE, AND LICENSE PLATE

(71) Applicant: 3M INNOVATIVE PROPERTIES COMPANY, St. Paul, MN (US)

(72) Inventors: Akira Muramoto, Kanagawa (JP); Toshitaka Nakajima, Yamagata-Pref (JP)

(73) Assignee: 3M Innovative Properties Company, St. Paul, MN (US)

( * ) Notice: Subject to any disclaimer, the term of this patent is extended or adjusted under 35 U.S.C. 154(b) by 832 days.

(21) Appl. No.: 14/409,067

(22) PCT Filed: Jun. 19, 2013

(86) PCT No.: PCT/US2013/046486
§ 371 (c)(1),
(2) Date: Dec. 18, 2014

(87) PCT Pub. No.: WO2013/192275
PCT Pub. Date: Dec. 27, 2013

(65) Prior Publication Data
US 2015/0191132 A1    Jul. 9, 2015

(30) Foreign Application Priority Data

Jun. 19, 2012   (JP) ................... 2012-138144

(51) Int. Cl.
*G09F 13/16*   (2006.01)
*B60R 13/10*   (2006.01)

(52) U.S. Cl.
CPC .............. *B60R 13/10* (2013.01); *G09F 13/16* (2013.01)

(58) Field of Classification Search
CPC .. B32B 3/00; B32B 7/00; B32B 17/00; B32B 27/00; B32B 37/00
See application file for complete search history.

(56) References Cited

U.S. PATENT DOCUMENTS

| 4,664,966 A | 5/1987 | Bailey |
| 4,767,659 A | 8/1988 | Bailey |
| 5,008,142 A | 4/1991 | Wilson |
| 5,069,964 A | 12/1991 | Tolliver |
| 5,287,620 A | 2/1994 | Suzuki |
| 5,656,360 A | 8/1997 | Faykish |
| 5,882,771 A | 3/1999 | Klein |

(Continued)

FOREIGN PATENT DOCUMENTS

| CA | 1287458 | 8/1991 |
| EP | 0 416 742 | 8/1990 |

(Continued)

OTHER PUBLICATIONS

International Search report for PCT International Application No. PCT/US2013/046486, dated Aug. 23, 2013, 3pgs.

*Primary Examiner* — Cassandra Davis

(57) ABSTRACT

A license plate sheet having superior weather resistance is provided. A license plate comprising the license plate sheet and having markings visible to a infrared-based ALPR system, is also provided. In some embodiments, the license plate sheet includes an infrared absorbing marking layer, wherein the infrared absorbing marking layer includes cesium tungsten oxide and a binder.

11 Claims, 12 Drawing Sheets

(56) References Cited

U.S. PATENT DOCUMENTS

| | | |
|---|---|---|
| 6,083,607 A | 7/2000 | Mimura |
| 7,387,393 B2 | 6/2008 | Reich |
| 8,538,224 B2 | 9/2013 | Lamansky |
| 2002/0164460 A1 | 11/2002 | Bacon, Jr. |
| 2003/0211299 A1 | 11/2003 | Rajan |
| 2004/0073798 A1 | 4/2004 | Look |
| 2007/0133775 A1 | 6/2007 | Winkler |
| 2007/0256782 A1 | 11/2007 | Haldeman |
| 2010/0151213 A1 | 6/2010 | Smithson |
| 2010/0220388 A1 | 9/2010 | Suzuki |
| 2012/0129090 A1 | 5/2012 | Mamak |
| 2013/0034682 A1 | 2/2013 | Free |
| 2015/0064428 A1* | 3/2015 | Matsuo ............ B32B 27/36 428/212 |

FOREIGN PATENT DOCUMENTS

| | | |
|---|---|---|
| JP | H02-145381 | 6/1990 |
| JP | H03-173691 | 7/1991 |
| JP | H06-186908 | 7/1994 |
| JP | H10-049642 | 7/1996 |
| JP | H11-052487 | 2/1999 |
| JP | 2007-021998 | 2/2007 |
| JP | 2008-304798 | 12/2008 |
| JP | 2009-535248 | 10/2009 |
| JP | 2012-21066 | 2/2012 |
| JP | 2012-506463 | 3/2012 |
| JP | 2012-512428 | 5/2012 |
| WO | WO 1995-26281 | 10/1995 |
| WO | WO 2007/130773 | 11/2007 |
| WO | WO 2010/046285 | 4/2010 |
| WO | WO 2010/074875 | 7/2010 |
| WO | WO 2011-046953 | 4/2011 |
| WO | WO 2011-046957 | 4/2011 |

* cited by examiner

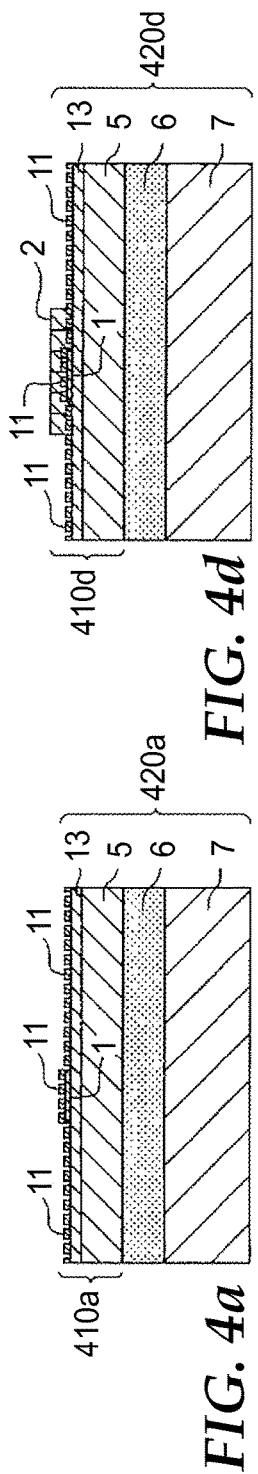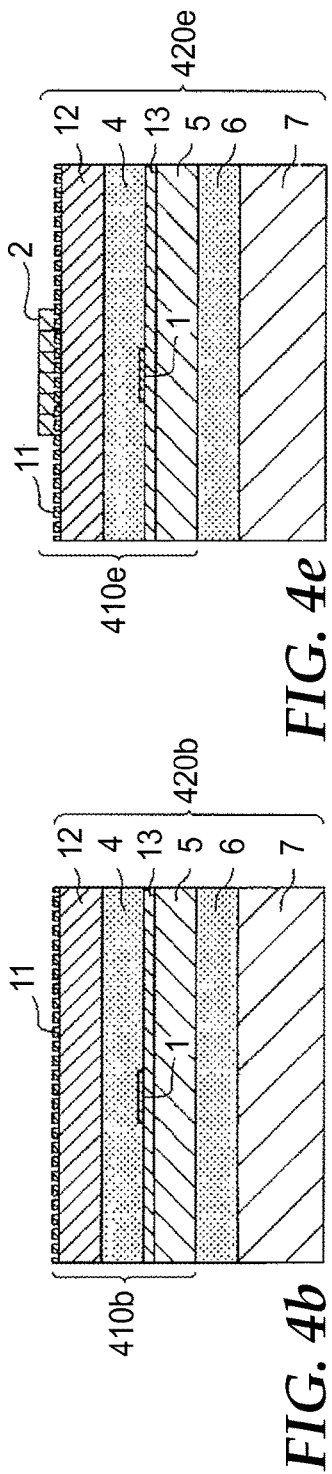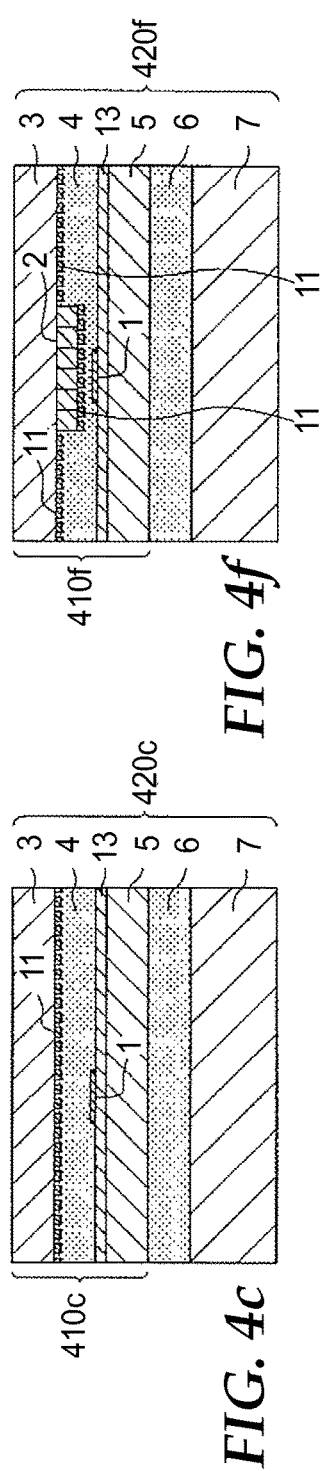

SHEET FOR LICENSE PLATE, LAMINATE FOR LICENSE PLATE, AND LICENSE PLATE

The present application relates generally to a license plate sheet, a license plate laminate, and a license plate, as well as methods of making all of these.

BACKGROUND

Automated license plate reader (ALPR) systems are typically used for detection and recognition of license plates. One example of an ALPR system uses an infrared camera and an infrared light source for irradiating a license plate with infrared rays. Typically, ALPR systems use an electrical system to detect and check passenger vehicles. Detection and recognition of license plates is useful in, for example, the enforcement of traffic laws, investigation of vehicles used to commit crimes, and for vehicle access control to facilities. Police are also sometimes equipped with mobile ALPR systems in patrol cars.

As mentioned above, license plates may be counterfeited and vehicles having such counterfeited license plates used to commit crimes. Consequently, recognition of counterfeited license plates is desired. Some techniques used to prevent counterfeiting of license plates are mechanical mechanisms such as, for example, embossing numbers and characters on the license plate, using aluminum seals, and the like. However, these mechanical mechanisms cannot be detected by ALPR systems.

Exemplary anti-counterfeiting mechanisms capable of being detecting by infrared rays have been proposed, such as, for example, in Japanese Unexamined Patent Application Publication No. H1-152487 (Patent Reference 1) which describes a hidden printing label, wherein a black organic dye that transmits infrared rays is used to color one or both of a film and preferably an adhesive agent layer provided on one side of the film, an information printing layer is provided in the adhesive agent layer through an ink containing an inorganic pigment that absorbs infrared rays, and a release paper is provided on this printing layer. Japanese Unexamined Patent Application Publication No. H3-173691 (Patent Reference 2) describes a heat sensitive transfer material including a thermal transfer ink layer that contains a compound that selectively absorbs wavelengths from 400 nm to 700 nm, and a thermal transfer ink layer that contains a compound that selectively absorbs light having a wavelength from 700 nm to 1500 nm, provided on a substrate.

Japanese Unexamined Patent Application Publication No. H6-186908 (Patent Reference 3) describes a seal characterized in that a verification layer composed of an infrared absorbing ink and a pattern layer composed of an infrared transmitting ink are provided on the surface of a fragile base sheet, and a release sheet is adhered to the back via an adhesive layer.

Japanese Utility Model Publication No. 02584911 (Patent Reference 4) describes an anti-counterfeiting label characterized by the anti-counterfeiting label including: a label base that has first and second surfaces, an adhesive layer that is formed on the first surface, an infrared non reflective pattern that is formed on the second surface, a shielding layer that is formed on the infrared non reflective pattern, and an infrared transmitting ink material based camouflage layer that is formed on the shielding layer; and the infrared non reflective pattern including an infrared reflective layer formed on the second surface, and an infrared absorbing layer formed in a predetermined pattern on the infrared reflective layer.

Japanese Unexamined Patent Application Publication No. 2007-171956 (Patent Reference 5) describes a low visibility retroreflective visual tag such that, to form the low visibility retroreflective visual tag, the production thereof includes a step that places an infrared shielding material on the retroreflective substrate, the infrared shielding material is placed so as to form a pattern, and when the low visibility retroreflective visual tag is irradiated by an infrared light source, the pattern can be recognized by using an infrared sensor.

Japanese Unexamined Patent Application Publication No. 2007-021998 (Patent Reference 6) describes an infrared absorbing film characterized in that: the infrared absorbing film has a substrate film and a cured product layer having an energy cured resin composition that contains an inorganic pigment provided on one side thereof; the light transmittance over the entire wavelength range from 850 to 1300 nm is 10% or less; and the visible light transmittance is at least 65%.

Japanese Unexamined Patent Application Publication No. H2-145381 (Patent Reference 7) describes an information containing composite layer characterized in that two layers are provided for which visual recognition is impossible or difficult, and these layers possess at least one location having a specific wavelength range within which the spectral reflectivity difference is at least 30% in the near infrared region from 700 to 2500 nm.

A license plate that uses a retroreflective sheet including an infrared non-transmissive material, a reflective layer, and cube corner elements is described in PCT Publication No. WO 2011/046957.

SUMMARY

The present inventors sought to develop a license plate having markings capable of being recognized by an ALPR system. Specifically, the present inventors have developed a license plate sheet capable of being recognized by an infrared-based ALPR system. The license plate sheet of the present application enables manufacturing of a license plate having superior weather resistance. As used herein, an infrared-based ALPR system means an ALPR system that reads the information of a license plate by irradiating the license with infrared light (e.g., having a wavelength of between 800 and 1000 nm).

In one aspect, the present application includes a license plate sheet comprising an infrared absorbing marking layer, wherein the infrared absorbing marking layer includes cesium tungsten oxide and a binder. According to another aspect of the present application, the license plate sheet has superior weather resistance. According to yet another aspect of the present application, the license plate sheet is used to form a license plate laminate which can then be used in making a license plate. The license plate of the present application has markings capable of being recognized by an infrared-based ALPR system.

BRIEF DESCRIPTION OF THE DRAWINGS

FIGS. 4(a) through 4 (f) depict cross sections of license plate sheets and license plate laminates according to one aspect of the present application.

FIG. 7 shows digital pictures of license plate sheets prepared as described in Comparative Example 1 and Embodiment 1. FIGS. 7c-1, 7c-2, 7d-1 and 7d-2 are digital pictures of the license plate prepared as described in Embodiment 1.

DETAILED DESCRIPTION

Figure 1A:
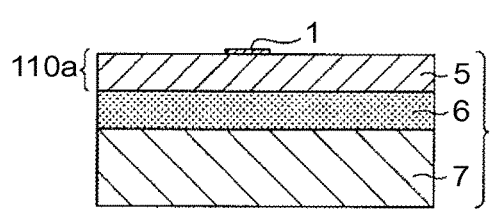
FIGS. 1(a) through 1(h) depict cross sections of license plate sheets and license plate laminates according to one aspect of the present application.

"Infrared absorbing marking layer" as used herein means a layer that can be detected or recognized through the use of infrared rays, based on the property of infrared absorbency of the material forming the layer. In some embodiments, the infrared absorbing marking layer comprises indicia (e.g., alphanumeric characters, shape, pattern, or the like).

"Retroreflective substrate" means a substrate capable of retroreflecting light incident upon the retroreflective substrate in substantially the same direction as the light source.

"Non-retroreflective substrate" means a substrate not capable of retroreflecting light incident upon the retroreflective substrate in substantially the same direction as the light source.

"Capable of absorbing infrared rays" means that the average transmittance of infrared (IR) light (e.g., having a wavelength from 800 to 1000 nm) is less than the average transmittance of visible light (e.g., having a wavelength from 400 to 800 nm).

"Infrared transmissive" means that the average transmittance of IR light is greater than or equal to the average transmittance of visible light. In some embodiments, IR transmissive means that the average transmittance of IR radtiation is at least 75%.

"Visibly transparent" means that, unless otherwise indicated, the average transmittance of visible light is at least 75%.

"Visibly opaque" means that, unless otherwise indicated, the average transmittance of visible light is less than 75%.

Below, various aspects of the present application will be described, however these aspects should not be construed as limiting the present application.

In one aspect, the present application provides a license plate sheet that includes a marking layer capable of absorbing infrared rays. The marking layer may contain information (indicia) capable of being detected, read and/or recognized by infrared rays. The marking layer typically comprises cesium tungsten oxide and a binder.

In another aspect, the present application provides a license plate laminate that includes a base plate and the license plate sheet disposed on the base plate. Yet in another aspect, the present application provides a license plate formed by using the license plate laminate. In some embodiments, a license plate is formed by adding plate identifiers to the license plate laminate, such as, for example, alphanumeric characters. Such plate identifiers may be printed on or embossed on the license plate laminate, thus forming the license plate.

In some embodiments, the marking layer is used as a security mark. A security mark is useful for preventing counterfeiting, since it is generally difficult to be reproduced. Security marks are also useful for recognizing counterfeited products. In other embodiments, the marking layer can be provided as indicia to improve detection and recognition under infrared irradiation of a display area, which is the area of the license plate that contains plate identifiers. Said display area is visible under visible light irradiation. In these embodiments, indicia help locate and/or identify the display area under infrared radiation conditions.

The license plate laminate of the present application comprises a substrate and a license plate sheet disposed on at least a portion of the substrate.

License plate sheets of the present application have at least one of the following advantages: (1) superior outdoor weather resistance; (2) a marking layer that can be recognized using an infrared camera; (3) whiteness that satisfies the ISO 7591 license plate specification regarding cap-Y (i.e., greater than cap-Y 35); (4) the license plate sheet is disposed on a base plate that can withstand high-speed embossing or debossing processes without generating large cracks; and (5) the license plate sheet is disposed on a base plate that can withstand deformation without delaminating from the base plate, especially in the periphery of the region deformed by embossing.

Examples of license plate sheets, license plate laminates and license plates of the present application will be described hereinafter with reference to the drawings. In the drawings, unless otherwise indicated, elements having the same symbols have the same configuration, and the descriptions thereof are not repeated. In addition, when reference is made to a stacked arrangement based on a plurality of layers, note that, unless otherwise indicated, another layer (for example, an adhesive layer) may or may not be interposed between the referenced plurality of layers.

FIGS. 1 through 5 are cross sections of license plate sheets and license plate laminates according to the present application. In FIGS. 1 through 5, license plate sheets (110a through 110h, 210a through 210f, 310a through 310f, 410a through 410f, and 510a through 510f) include a substrate 5 and a marking layer 1 adjacent the substrate 5. In some embodiments, marking layer 1 is disposed on at least a portion of at least one side of the substrate 5. In other embodiments, marking layer 1 is disposed across the entire surface of at least one side of the substrate 5.

License plate laminates (120a through 120h, 220a through 220f, 320a through 320f, 420a through 420f, and 520*a* through 520*f*) further include a base plate 7 having a top surface and a bottom surface. License plate sheets (110*a* through 110*h*, 210*a* through 210*f*, 310*a* through 310*f*, 410*a* through 410*f*, and 510*a* through 510*f*) are disposed on the top surface of base plate 7. In some embodiments, the license plate sheet can be secured to the base plate 7 using a first adhesive layer 6.

Figure 1E:
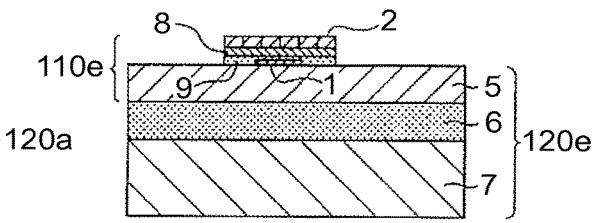
Figure 1B:
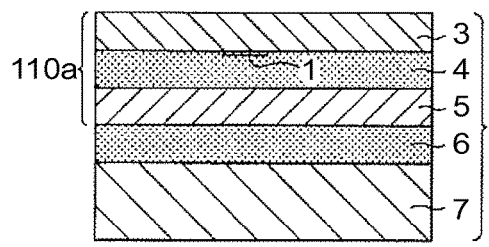
Figure 1F:
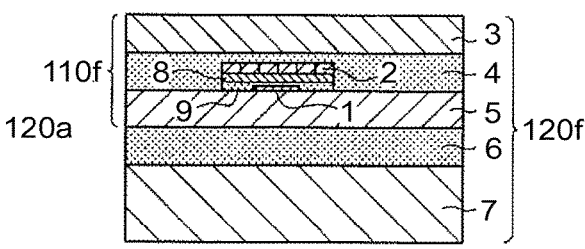
Figure 1C:
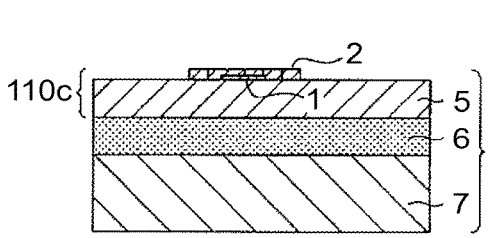
Figure 1G:
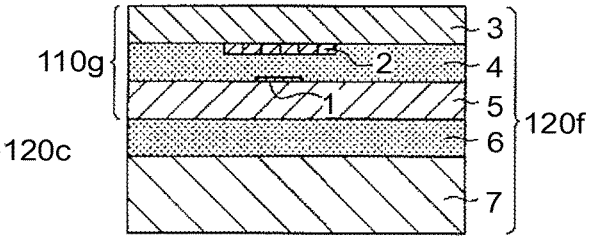
Figure 1D:
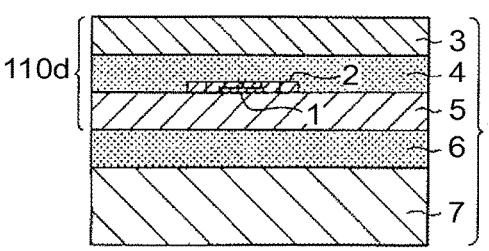
Figure 1H:
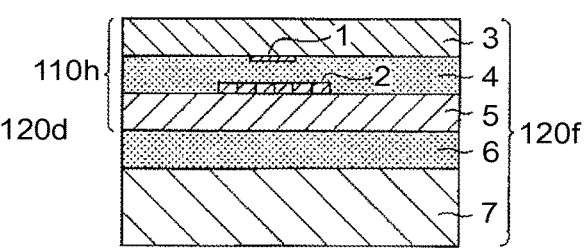

License plate sheets according to the present disclosure can further include a printing layer 2, as shown in FIGS. 1*c* through 1*h*. In some embodiments, printing layer 2 is a graphic layer disposed on at least a portion of one layer of the license plate sheet (210*c*, 210*d*, 210*e*, 210*f*, 210*g*, 210*h*). In some embodiments, at least a portion of the printing layer 2 completely overlaps with marking layer 1, as seen when the license plate laminate is viewed planarly in the sheet thickness direction (namely in the doward direction in FIGS. 1 *c* through 1*h*). Light is incident on the uppermost surface of the license plate laminate (hereinafter referred to as light incident face), which is typically opposite base plate 7. In some embodiments, printing layer 2 is disposed closer to the light incident face than to the marking layer 1 (as shown in FIGS. 1*c* through 1*g*). In these embodiments, marking layer 1 may be concealed by the printing layer 2. In one embodiment, printing layer 2 is visibly opaque and IR transmissive. In this embodiment, marking layer 1 is concealed by the printing layer in visible light conditions. These embodiments are particularly advantageous for use as security marks. In other embodiments, marking layer 1 is disposed closer to the light incident face than to the printing layer 2 (as shown in FIG. 1*h*). The printing layer 2 may be optionally disposed on the marking layer 1 via a bonding layer 9 and/or a transparent film 8, as shown in FIGS. 1*e* and 1*f*. In some embodiments, marking layer 1 is preformed on substrate 5, that is, marking layer 1 is coated onto or otherwise disposed on substrate 5 prior to forming printing layer 2. Printing layer 2 may be formed (e.g., by coating a printing composition (i.e., printing) or otherwise disposing the printing layer) on transparent film 8 and adhered to marking layer 1 via the bonding layer 9.

The license plate sheets of the present application can further include a printable clear film such as, for example, an overlaminate film 3. Overlaminate film 3 is shown, for example, in FIGS. 1*b*, 1*d*, 1*f*, 1*g*, and 1*h*. In Some embodiments, the marking layer 1 and/or printing layer 2 are optionally disposed adjacent the back side of the overlaminate film 3. In some embodiments, a second adhesive layer 4 is used to secure overlaminate film 3 to the substrate 5

FIGS. 2*a* through 2*f* depict cross sections of license plate laminates according to the present application. In these license plate laminates (220*a*, 220*b*, 220*c*, 220*d*, 220*e*, 220*f*), license plate sheets (210 *a*, 210*b*, 210*c*, 210*d*, 210*e*, 210*f*) further include a toning layer 10. Toning layer 10 is particularly useful when marking layer 1 has a different color than the substrate 5. In these embodiments, toning layer 10 may be used to conceal marking layer 1 under visible light and/or minimize color differences between marking layer 1 and substrate 5. In some embodiments, there is little color difference between the marking layer 1 and the toning layer 10. In some embodiments, the toning layer 10 is disposed over at least a portion of the marking layer 1. In other embodiments the toning layer 10 at least partially surrounds marking layer 1.

Figure 2A:
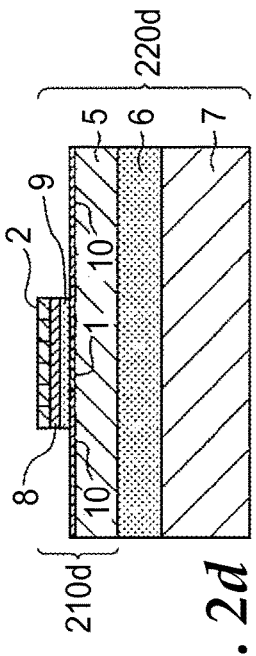
FIGS. 2(a) through 2(f) depict cross sections of license plate sheets and license plate laminates according to one aspect of the present application.
Figure 2B:
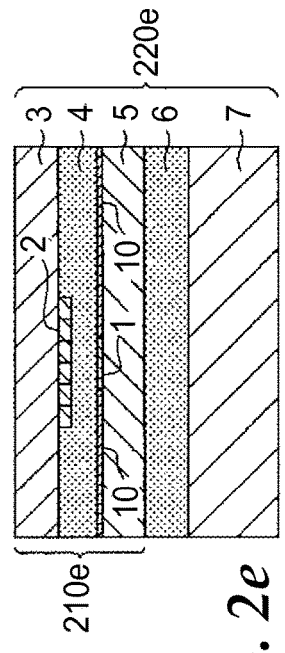
Figure 2C:
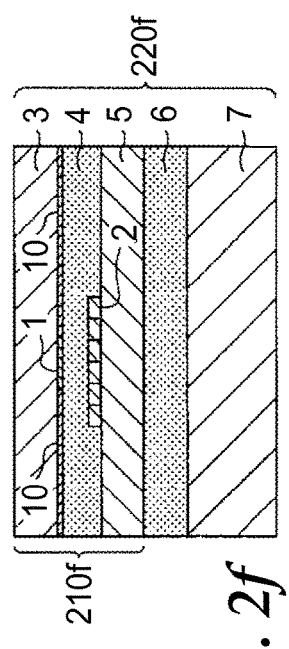
Figure 2D:
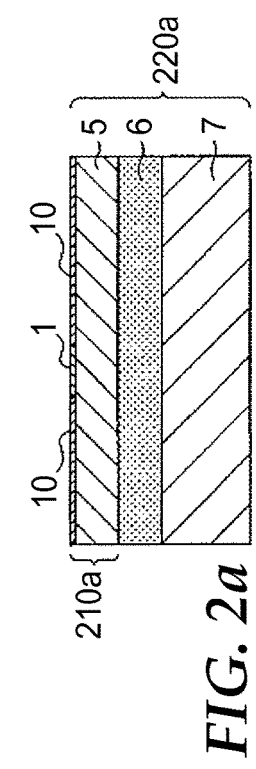
Figure 2E:
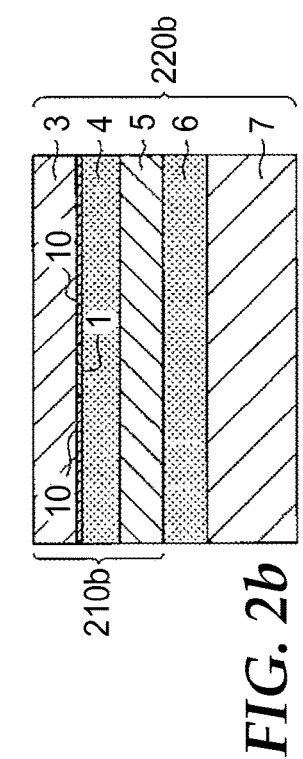
Figure 2F:
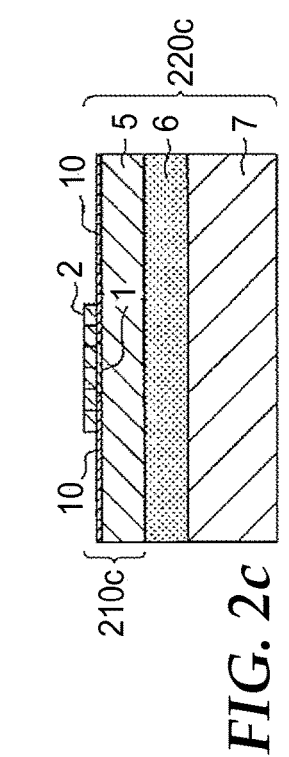

Overlaminate film 3 is optionally disposed over the toning layer 10, as shown in FIGS. 2*a*, 2*e*, and 2*f*. The license plate laminate 220*c* shown in FIG. 2*c* includes a license plate sheet 210*c* comprising a substrate 5 secured to a base plate 7 by means of the first adhesive layer 6. Marking layer 1 is disposed on one surface of the substrate 5, opposite the first adhesive layer 6. Toning layer 10 is disposed on the marking layer 1 and over the entire surface of the substrate 5. Printing layer 2 is then disposed on a portion of the toning layer 10. In some embodiments, such as the license plate laminate shown in FIG. 2*d*, printing layer 2 is disposed adjacent transparent film 8. Transparent film 8 may be secured to the toning layer 10 by means of bonding layer 9. In other embodiments, such as shown in FIG. 2*e*, printing layer 2 is disposed on the back side of overlaminate film 3 (i.e., side opposite the light incident face). The overlaminate film 3 is then disposed on toning layer 10 by means of the second adhesive layer 4. In other embodiments, such as shown in FIG. 2*f*, printing layer 2 is disposed on at least a portion of the substrate 5. Marking layer 1 and toning layer 10 are disposed on the back side of the overlaminate film 3, and brought into contact with the printing layer 2 (and substrate 5) by means of the second adhesive layer 4. Several combinations of each layer in license plate laminates and the license plate sheets including toning layer 10 are possible, and some arrangements are shown in FIGS. 2*a* through 2*f*. However, these arrangements should not be construed as limiting the present application.

As shown in FIG. 3, in some embodiments the license plate sheet can further include a second printing layer, which is a shielding layer 11. The shielding layer 11 is disposed over at least a portion of one of the layers of a license plate sheet. Alternatively, shielding layer 11 is disposed over the entire surface of at least one of the layers of the license plate sheet. Shielding layer 11 may be used to conceal (i.e., reduce visibility) of the marking layer 1 under. In some embodiments, shielding layer 11 is used to increase whiteness of the license plate sheet. In some embodiments, shielding layer 11 is a discontinuous layer and formed as stripes, dots, and/or any other pattern or shape. In some embodiments, shielding layer 11 is disposed in a position closer to the light incident face than to the substrate 5. When the license plate sheet is viewed planarly in the thickness direction, at least a portion of the shielding layer 11 completely overlaps with marking layer 1. Disposition of the shielding layer 11 in the license plate sheet can vary according to desired properties and/or process of making the license plate laminate. From the standpoint of satisfactorily shielding the marking layer 1, the shielding layer 11 may be positioned closer to the light incident face than the marking layer 1, as shown in FIGS. 3*a* through 3*f*.

Figure 3D:
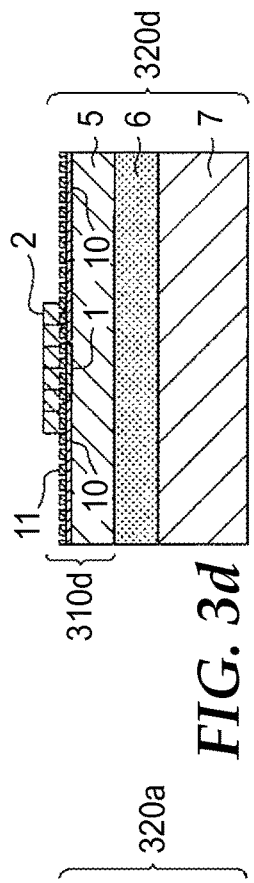
FIGS. 3(a) through 3(f) depict cross sections of license plate sheets and license plate laminates according to one aspect of the present application.
Figure 3E:
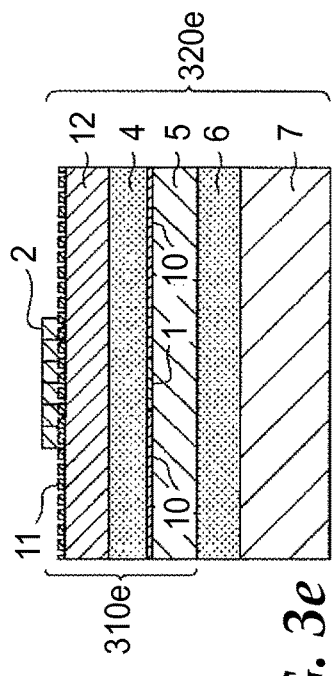
Figure 3F:
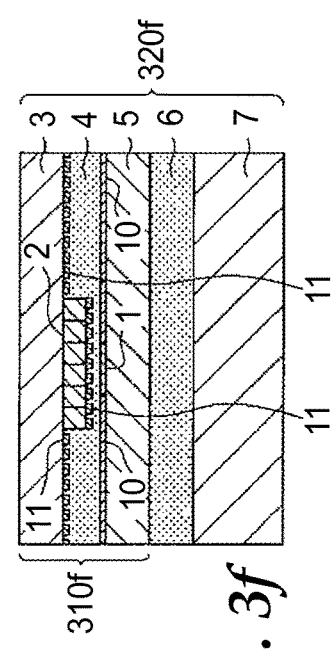
Figure 3A:
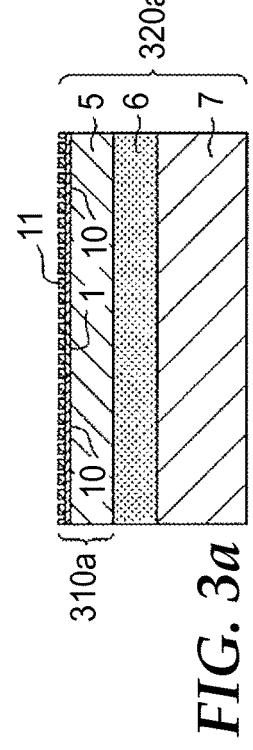
Figure 3B:
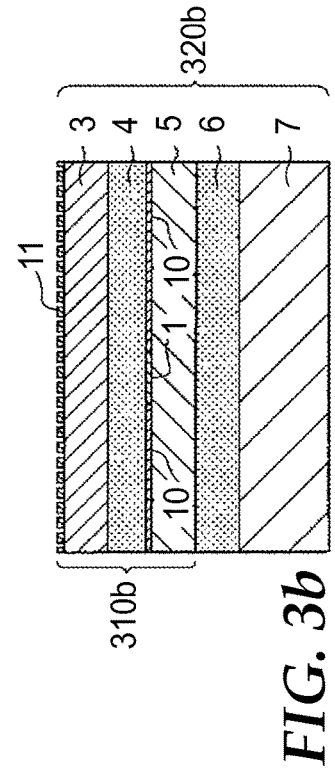
Figure 3C:
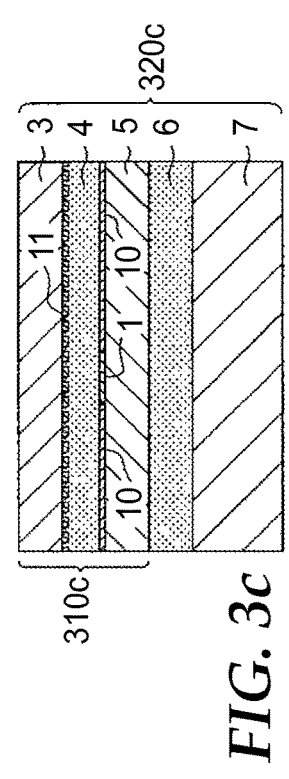

FIG. 3*a*, shows a license plate sheet 310*a* and license plate laminate 320*a* according to one embodiment of the present application. In this embodiment, printing layer 11 is disposed adjacent marking layer 1 and the toning layer 10.

License plate sheets (310*d*, 310*e*, 310*f*) and license plate laminates (320*d*, 320*e*, 320*f*) shown in FIGS. 3*d* through 3*f*, further comprise printing layer 2. In some embodiments, printing layer 2 is disposed adjacent shielding layer 11 and on the light incident face (i.e., uppermost portion of the overlaminate film 3), as shown in FIGS. 3*d* and 3*e*. In other embodiments, shielding layer 11 is disposed on the back side of the overlaminate film 3 (i.e., opposite the light incident face), and printing layer 2 is disposed on the shielding layer 11, as shown in FIG. 3*f*. An exemplary method for making the license plate sheet 310*f* shown in FIG. 3*f* includes the steps of: providing the overlaminate film 3; forming the printing layer 2 on at least a portion of the back side of the overlaminate film 3; forming shielding layer 11 on the back side of the overlaminate film 3 (and on printing layer 2); and applying (e.g., by coating, laminating of otherwise disposing) the adhesive layer 4 to the shielding layer 11. In a separate step, toning layer 10 and marking layer 1 are formed on substrate 5. The adhesive layer 4 is then brought into contact with the toning layer 10 and marking layer 1. In some embodiments, printing layer 2 is a graphic layer. In such embodiments, the combination of shielding layer 11 and graphic printing layer 2 is used to conceal marking layer 1 under visible light conditions, and are therefore closer to the light incident face than the marking layer 1 is. In other embodiments, toning layer 10 is also used to improve concealment of marking layer 1.

In some embodiments, shielding layer 11 and printing layer 2 (FIG. 3e) are disposed on the top surface of a transparent film 12. In some embodiments, transparent film 12 is a printable film. A second adhesive layer 4 contacts the bottom surface of transparent film 12, and secures transparent film 12 to the substrate 5. In some embodiments, the bottom surface of the transparent film 12 contacts toning layer 10 and marking layer 1, which are disposed on substrate 5. An exemplary method for making the license plate laminate 320e shown in FIG. 3e includes, for example, forming shielding layer 11 on the top surface of the transparent film 12, and forming printing layer 2 on at least a portion of the shielding layer 11; applying the second adhesive layer 4 to the bottom surface of the transparent top film; and adhering the transparent film 12 to the toning layer 10 and marking layer 1, which are disposed on substrate 5. In another exemplary method for making the license plate 320e, the second adhesive layer 4 is formed on the toning layer 10 and marking layer 1. The transparent film 12 having shielding layer 11 and printing layer 2 formed thereon, is then placed on the second adhesive layer 4. Optionally, an overlaminate film 3 (not shown) may be disposed on the top surface of the transparent film 12.

The license plate sheet of the present application can further comprise an infrared absorbing layer 13, as shown in FIG. 4. The infrared absorbing layer 13 may extend through the area of at least one surface of the license plate sheet. Alternatively, infrared absorbing layer 13 is disposed on at least a portion of one layer within the license plate sheet. The use of infrared absorbing layer 13 is especially advantageous when the substrate 5 is a retroreflective substrate. In these embodiments, the infrared absorbing layer 13 contributes to the control of halation (i.e., the spreading of light around bright areas in an image) in images taken with infrared-based ALPR systems. Typically, retroreflective substrates retroreflect incident light of all wavelengths, including infrared light. As such, images taken of a retroreflective substrate with an infrared camera may have a bright spot which is caused by the retroreflected IR light. The present inventors sought to control the amount of IR light that is retroreflected back to the IR camera by using the infrared absorbing layer 13. In this embodiment, the infrared absorbing layer 13 is positioned closer to the light incident face than the substrate 5 is. The infrared absorbing layer may be disposed on the substrate 5 or on any other layer within the license plate sheet. In order for the marking layer 1 to be detected by the IR camera, it is preferably disposed closer to the light incident face than infrared absorbing layer 13 is.

In some embodiments, such as shown in FIG. 4, the license plate sheet contains both the infrared absorbing layer 13 and the shielding layer 11. The license plate sheet 410a shown in FIG. 4a, comprises the infrared absorbing layer 13 disposed over the entire area of one surface of substrate 5. Shielding layer 11 is disposed adjacent infrared absorbent layer 13, opposite the substrate 5. In some embodiments, shielding layer 11 is used to increase whiteness of the license plate sheet. A second shielding layer 11 may be disposed on at least a portion of the first shielding layer 11, to aid in concealing marking layer 1. In the embodiment shown in FIG. 4a, the shielding layer 11 is disposed on the uppermost side of the license plate sheet 410a, that is, the light incident face of the license plate laminate 420a. The license plate sheet 410b shown in FIG. 4b includes the substrate 5 having the infrared absorbing layer 13 formed thereon, and the marking layer 1 formed on the infrared absorbing layer 13. A transparent film 12 is secured to the infrared absorbing layer 13 (and to the marking layer 1) by the second adhesive layer 4. The transparent film 12 has a shielding layer 11 disposed on its uppermost surface, the shielding layer 11 being the light incident face of the license plate laminate 420b. The license plate sheet 410c shown in FIG. 4c, is similar to the license plate sheet 410b of FIG. 4b, except that (i) it comprises an overlaminate film 3 as the uppermost layer in lieu of the transparent film 12; and (ii) that shielding layer 11 is formed on the back side of the overlaminate film 3. In FIGS. 4d, 4e and 4f, license plate sheets (410d, 410e, and 410f) further comprise a printing layer 2. In FIGS. 4d and 4e, the printing layer 2 is disposed on the uppermost surface of the license plate sheets 410d and 410e (i.e., on the light incident face). In FIG. 4f, the printing layer 2 is disposed on the back side of the overlaminate film 3. In some embodiments, shielding layer 11 is positioned in front of the infrared absorbing layer 13, such that light incident on the license plate sheet will hit the shielding layer 11 first, before the infrared absorbing layer 13. In some embodiments, shielding layer 11 is visibly opaque and IR transparent, that is, it allows IR light to pass through. In these embodiments it is possible to obtain a license plate sheet having a predetermined whiteness or desired color by imparting said desired color to the shielding layer 11. Because shielding layer 11 is visibly opaque, all layers positioned below the shielding layer 11 will not be visible to the viewer under visible light conditions. As such, layers disposed below the shielding layer may have any color as they won't substantially change the colors imparted by the shielding layer 11.

The license plate sheets of the present application may further comprise the toning layer 10 in addition to the infrared absorbing layer 13, as shown in FIG. 5. In these embodiments, the toning layer 10 and the shielding layer 11 will reduce the visibility of the marking layer 1 under visible light irradiation (i.e., conceal marking layer 1), whereas the infrared absorbing layer 13 provides the aforementioned halation control effect. Moreover, regardless of the color of the infrared absorbing layer 13, it is possible to obtain a license plate sheet having a predetermined whiteness or other desired color, by modifying the color of the shielding layer 11. The marking layer 1 and the toning layer 10 may be positioned farther from the light incident face than from the shielding layer 11.

Exemplary materials useful in the present application are listed below.

Marking Layer 1: Marking layer 1 typically includes a binder and particles of cesium tungsten oxide (hereinafter, referred to as "CWO"). CWO provides the marking layer 1 with superior weather resistance and infrared absorbency. Therefore, the license plate sheet of the present application has superior durability in outdoor applications.

It is particularly advantageous to use the marking layer 1 of the present application disposed on a white substrate, such that the overall appearance of the license plate is white. However, when the color of the substrate 5 is not white, the marking layer 1 may further comprise a pigment to color match the color of the substrate 5. As a result, marking layer 1 is inconspicuous to viewer.

The marking layer 1 may be disposed in such a way that it forms a pattern and/or shape. In this embodiment, the pattern and/or shape may be visible under visible light irradiation (i.e., visibly opaque).

The marking layer 1 may be provided as a sheet which is subsequently laminated or otherwise adhered to the desired layer. Alternatively, the making layer 1 may be formed from a coating composition applied to the intended surface. When a coating composition is used, it may be applied to the desired substrate by printing, casting, or any other known techniques. The thickness of the marking layer typically ranges from at least about 0.1 µm to about 150 µm. In some embodiments, the marking layer is at least about 1 µm or at least about 3 µm thick. In other embodiments, the thickness of the marking layer 1 is less than about 150 µm, less than or about 100 µm, or less than about 50 µm.

In some aspects, the marking layer 1 is colorless or near colorless. A colorless marking layer 1 is particularly advantageous in security mark applications, so that marking layer 1 is inconspicuous to the viewer under visible light conditions. In some embodiments, the colorless marking layer is substantially invisible to the naked eye under visible light conditions. By "substantially invisible", it is meant that a viewer holding the license plate sheet under visible light conditions at a distance of about 2 meters can't see the marking layer 1. Exemplary methods of making a colorless or near colorless marking layer include, for example, at least one of the following: using a transparent binder, reducing the concentration of CWO particles, reducing the CWO particle diameter, and eliminating secondary aggregation of CWO particles.

In some embodiments, the marking layer 1 is colored. As mentioned above, the marking layer 1 may provide indicia which are useful in locating and/or identifying the display area of the license plate under infrared radiation. Additional layers such as at least one of toning layer, shielding layer, and graphic layer may optionally be used. Such layers may be positioned closer to the light incident face of the laminate sheet than to the marking layer. In these embodiments, it is possible to form a security mark that is inconspicuous to the viewer under visible light irradiation, even if the marking layer is colored. In some embodiments, the additional layers are visibly opaque and IR transparent. In these embodiments, the additional layers may be used to conceal the marking layer under visible light, but the marking layer is still visible in the IR.

The marking layer 1 typically has an average transmittance of IR light of about 98% or below, or about 95% or below. In some embodiments, average transmittance of IR light is at least about 0.5%, or at least about 1%. In some embodiments, average transmittance of IR light is below the average transmittance of visible light.

In a white license plate sheet, cap-Y of a white substrate comprising the marking layer is preferably greater than about 35, or greater than about 40. In some embodiments, cap-Y is less than about 95, or less than about 90. In the present disclosure, "whiteness" is measured by a cap-Y scale, which is a measured using a spectrophotometer.

CWO contributes to infrared absorbency, and as such, provides superior weather resistance to articles having CWO. It is advantageously used as an infrared absorbing material in license plate sheets planned for outdoor use.

Exemplary CWO compositions are expressed by the general formula CsxWyOz (wherein $0.001 \leq x/y \leq 1$, and $2.2 \leq z/y \leq 3.0$). Preferably, $0.1 \leq x/y < 1$, and $2.45 \leq z/y \leq 3.0$, and particularly preferably, $x/y=0.33$ and $z/y=3$.

To reduce haze in the marking layer 1, the average particle diameter size of CWO is preferably about 300 nm or less, or about 100 nm or less, or about 50 nm or less. In the present disclosure, the average particle diameter was measured using a Coulter N4 Plus (trade name) made by Coulter Corp. for the measurement.

Examples of commercially available infrared absorbers containing CWO suitable for the present application include YMF-02A (commercially available from Sumitomo Metal Mining Co., Ltd.) ($Cs_{0.33}WO_3$) (CWO concentration: 18.5 mass %), which is the CWO infrared absorber in used in the Examples below.

In some embodiments, the content of CWO in the marking layer 1 is at least about 0.05 weight % or at least about 0.5 weight %. In other embodiments, the content of CWO is less than about 40 weight %, or less than about 35 weight %.

Suitable materials for use as the binder composition of the marking layer 1 include, known polymers provided as a coating composition or as a preformed film. Specific examples of suitable polymers include at least one of polyurethane, (meth)acrylic or (meth)acrylate, epoxy, polyvinyl chloride, vinyl chloride-vinyl acetate copolymer, polyamide, polyester, polyisoprene, polybutadiene, phenolic-containing, urea-containing, melamine-containing, and the like. These may be used individually or in combinations of two or more. In the present disclosure, (meth)acrylic means acryl and methacryl. A cured/curable polymer (e.g., radiation or thermally curable) can also be used in addition to the above listed polymers.

In some embodiments, the binder preferably includes one or more polymers selected from the group consisting of polyurethane, (meth)acrylic resin, epoxy resin, polyvinyl chloride, vinyl chloride-vinyl acetate copolymer, polyamide, and polyester. In a preferred aspect, the binder is a (meth)acrylic resin. In one embodiment, the (meth)acrylic resin is a (meth)acrylic polymer having an amino group. Suitable (meth)acrylic polymers having amino groups include a (meth)acrylic polymer containing a carboxyl group, a copolymer of methyl methacrylate (MMA), butyl methacrylate (BMA), and dimethylaminoethyl methacrylate (DMAEMA); and a mixture with a copolymer of butyl acrylate (BA), 2-ethyl hexyl acrylate (2EHA), vinyl acetate (VAc), and acrylic acid (AA).

A single commercial product or a mixture of two or more commercial products can be used as the binder, or the binder can be readily synthesized by one skilled in the art by any publicly known method.

The binder content in the marking layer 1 is at least about 50 parts by weight, or at least about 100 parts by weight, or at least about 200 parts by weight, per 100 parts by weight of CWO. Preferably, the content of binder is less than about 200,000 parts by weight, or less than about 20,000 parts by weight, or less than about 15,000 parts by weight.

The marking layer 1 may further comprise other additives. Examples of optional additives include materials other than CWO that are capable of absorbing infrared rays, polymeric dispersing agents, surfactants, plasticizers, antistatic agents, viscosity modifiers, antifoams, antioxidants, UV light absorbers, and the like.

Examples of materials capable of absorbing infrared rays include, a tungsten oxide compound, titanium oxide, zirconium oxide, tantalum oxide, niobium oxide, zinc oxide, indium oxide, tin-doped indium oxide (ITO), tin oxide, antimony-doped tin oxide (ATO), cesium oxide, zinc sulfide, and a hexaboride such as $LaB_6$, $CeB_6$, $PrB_6$, $NdB_6$, $GdB_6$, $TbB_6$, $DyB_6$, $HOB_6$, $YB_6$, $5mB_6$, $EUB_6$, $ErB_6$, $TmB_6$, $YbB_6$, $LUB_6$, $SrB_6$, $CaB_6$, $(La, Ce)B_6$, and the like.

In some aspects, the marking layer is a film formed by a composition comprising CWO particles, binder, and, as desired, optional additives. Such film can be used as a standalone layer for a license plate sheet, or it may be disposed on another layer either by laminating it directly to the intended layer or using the second adhesive layer 6.

In some aspects, the marking layer can be formed from a coating composition by applying (e.g., coating) the composition onto a substrate or carrier, and drying the composition to form a film. The binder may be solvent-based or water-based. Examples of solvents include ethyl acetate, methyl ethyl ketone, methyl butyl ketone, and the like.

Overlaminate film 3: overlaminate film 3 may be used as a protective layer. In some embodiments, the overlaminate film 3 is the uppermost layer of the license plate laminate of the present disclosure.

Suitable materials for use as the overlaminate film 3 include, but are not limited to, commercially available films such as Gerber High Performance Series 220 Premium Film 220-114" (commercially available from Gerber Scientific Corporation.), "3M Scotchcal Graphic Film IJ5333", and "3M Digital License Plate Clear Protective Film 9097" (both commercially available from 3M Corporation). Alternatively, the overlaminate film 3 may be prepared by extruding and/or casting a composition onto a carrier to form a film. Other suitable manufacturing methods are apparent to one skilled in the art.

In some embodiments, marking layer 1 and/or printing layer 2 may be directly printed on at least one surface of the overlaminate film 3. In these embodiments, overlaminate film 3 may be a printable film.

Substrate 5: substrate 5 is a polymer film. Suitable polymers include at least one of: polyurethane, acrylic and/or acrylate, polyester, polyolefin, vinyl, polycarbonate, polyimide, polyamide, polyester amide, fluoropolymer, and the like.

In some embodiments, such as when the license plate sheet is subjected to embossing, the substrate 5 should be resistant to cracking and lifting; that is, substrate 5 should be made of a material having sufficient flexibility and stretchability to track the deformed shape of an embossed portion or a debossed portion. Particularly useful polymers for use as the substrate 5 in such demanding conditions include at least one of: vinyl chloride, vinyl chloride/vinyl acetate, urethane, acrylic and/or acrylates, polyolefin, and the like.

In some aspects, substrate 5 is a non-retroreflective substrate. A non-retroreflective substrate is advantageous when an ALPR system using visible light (e.g., flash) is used to read and/or identify a license plate. With such systems, the use of a visible light source may cause halation in the image taken from the license plate. Examples of non-retroreflective substrates include a sheet formed using one or more of the polymers listed above.

In other embodiments, substrate 5 is a retroreflective substrate. A retroreflective substrate is advantageous in that it provides good visibility of a distant license plate and/or a license plate lit by dim nocturnal light. Various conventionally known retroreflective sheets can be used as the retroreflective substrate 5. Examples include retroreflective sheets comprising a reflective layer (e.g., metallic layer), and retroreflective elements such, for example, beads, cube corners (e.g., truncated cube corners or full cube corners), lenslets and the like. Exemplary retroreflective sheets useful in the present application are described in, for example, Japanese Patent Gazette No. 2642099, Japanese Patent Gazette No. 2788030, Japanese Patent Gazette No. 2960478, Japanese Patent Gazette No. 3038218, Japanese Patent Gazette No. 3594969, Japanese Translation of Published PCT Application No. 2000-506623, and Japanese Translation of Published PCT Application No. 2000-508434, all of which are incorporated in their entirety herein by reference. Cube corner-based sheeting is sometimes referred to as prismatic sheeting. In some embodiments, retroreflective sheetings include a seal film in lieu of the reflective coating. Said seal film helps maintain an air interface behind the retroreflective elements, enabling total internal reflection (TIR). In other embodiments, an adhesive film comprising barrier materials is used in lieu of the seal film. Such barrier-containing films are disclosed in U.S. Publication No. 2013-0034682, the disclosure of which is incorporated herein by reference.

A retroreflective substrate is normally differentiated from a non-retroreflective substrate by a coefficient of retroreflection (brightness) (Ra). A retroreflective substrate has a brightness of, for example, at least 1 cd/lx/m$^2$ at an observation angle of 0.2 degrees and an entrance angle of 5 degrees, as defined by standard JIS Z 9117, "Retroreflective Materials". In another standard, for example, in ISO 7591, "Road vehicles—Retro-reflective registration plates for motor vehicles and trailers—Specification", the coefficient of retroreflection for a white retroreflective sheet is 45 cd/lx/m$^2$, and the coefficient of retroreflection for a yellow retroreflective sheet is 30 cd/lx/m$^2$.

Regardless of whether substrate 5 is retroreflective or non-retroreflective, the substrate thickness is preferably at least about 15 μm or at least about 45 μm. In some embodiments, it is easier to manufacture a license plate sheet according to the present disclosure if the thickness of the substrate is less than less than about 300 μm, or less than less than about 220 μm.

In some embodiments, the tensile strength of the substrate 5 is preferably at least about 5 N/25 mm, or at least about 10 N/25 mm, or at least about 20 N/25 mm. In other embodiments, tensile strength preferably is less than about 200 N/25 mm, less than about 175 N/25 mm, or less than about 150 N/25 mm. In the present disclosure, tensile strength is measured according to the procedure outlined in JIS Z 0237, "Testing Methods of Pressure Sensitive Adhesive Tapes and Sheets".

Elongation at break of the substrate 5 is at least about 30% or at least about 35%. In some embodiments, elongation is less than about 400% or less than about 350%. In the present disclosure, elongation is measured according to the procedure generally outlined in ASTM test method D882-80a, "Standard Test Method for Tensile Properties of Thin Plastic Sheeting".

Exemplary commercially available products useful as the substrate 5 include graphic films such as, for example, "3M Controltac Graphic Film IJ180-10" (commercially available from 3M Corporation), and "3M Scotchcal graphic film IJ5331" (commercially available from 3M Corporation), and retroreflective films, such as, for example, "3M reflective sheet BR190500" (commercially available from 3M Corporation), and "3M Preclear Reflective License Plate Sheeting 4750 and 4770" (commercially available from 3M Corporation).

Adhesive Layers (first adhesive layer 6, second adhesive layer 4, and/or bonding layer 9): first adhesive layer 4, second adhesive layer 6 and/or bonding layer 9 may be formed using known adhesive materials, which may be appropriately selected by one skilled in the art. Exemplary materials useful as the adhesive and/or bonding layers of the present application include, but are not limited to, at least one of acrylic and/or acrylate, epoxy, polyester, polyurethane, polyamine, polyurea, polyolefin, or the like. In some embodiments, the adhesive and/or bonding layer is colorless and/or transmissive to infrared rays. The adhesive layer may comprise a pressure-sensitive adhesive (PSA). Alternatively, the adhesive layer may comprise a heat-activatable adhesive.

Thickness of the adhesive layers and/or of the bonding layer typically ranges from at least about 10 µm or at least about 20 µm, to less than about 200 µm or less than about 100 µm.

Infrared absorbing layer 13: infrared absorbing layer 13 contributes to the control of halation when taking an image of a license plate under IR conditions. The infrared absorbing layer 13 is particularly useful when the substrate is a retroreflective substrate. From the standpoint of halation control, the infrared absorbing layer normally has infrared transmittance below that of the marking layer, but it is not limited thereto. The average transmittance of the infrared absorbing layer to IR light is at least about 0.5%, or at least about 1%; and preferably is less than about 80%, or less than about 70%.

Thickness of the infrared absorbing layer is at least about 1 µm or, at least about 5 µm from the standpoint of obtaining a satisfactory infrared absorbency effect. When the license plate laminate of the present application will be embossed, the thickness of the IR absorbing layer is typically less than about 100 µm or less than about 50 µm.

In some embodiments, infrared absorbing layer 13 comprises CWO particles.

An infrared absorbing layer may be contained in a substrate itself, such as described in PCT Publications No. WO2011/046953 and WO2011/046957, both of which are incorporated herein in their entirety.

Printing Layer 2 and Shielding Layer 11: printing layer 2 and/or shielding layer 11 may be formed using a material that is transmissive to infrared rays. Printing layer 2 and shielding layer 11 may be formed from a coating composition, or provided as sheet. In some embodiments, printing layer 2 and/or shielding layer 11 are formed using a thermal transfer printer. In other embodiments, printing layer 2 can be formed on a transparent film using an ink jet printer, a colored ink transmissive to infrared rays, and/or a colorless ink. Examples of suitable ink compositions include colored ink "Mimaki Genuine Ink" (commercially available from Mimaki Engineering Co., Ltd.), used in the JV5 ink jet printer (made by Mimaki Engineering Co., Ltd).

In some embodiments, shielding layer 11 is a discontinuous layer. In some embodiments, the shielding layer 11 is provided as a pattern, shape, or the like, such as, for example, a plurality of lines and/or a plurality of dots that are transmissive to infrared rays. In one embodiment, the discontinuous shielding layer 11 comprises a plurality of linear stripes having a width ranging from about 100 µm to about 1 mm, and spaced apart by gaps having from about 100 µm to about 1 mm. Examples of inks useful in the shielding layer include, but are not limited to, for example, "Gerber Color Spot Series Foil GCS-10 White" (commercially available from Gerber Scientific, Inc.), which is an ink for a thermal transfer printer.

Toning layer 10: toning layer 10 can be provided as a base for the marking layer 1 (i.e., marking layer 1 is disposed over toning layer 10), or around the marking layer 1. In the latter embodiment, a mask may be used to protect the area which will later be occupied by the marking layer 1, so that toning layer 10 is not applied to that area. Toning layer 10 can be provided over the entire surface or on at least a portion of at least one layer of the license plate sheet. In some embodiments, due to the use of CWO, which has a blue color, marking layer 1 is slightly bluish. In such cases, it is preferable that the toning layer 10 is color matched to the marking layer, and therefore also bluish. The toning layer may also be combined with the infrared absorbing layer 13 as a single layer. Alternatively, toning layer 10 may be provided adjacent infrared absorbing layer 13.

Color difference (ΔE*ab) between the toning layer 10 and the marking layer 1 ranges from about 0 to less than about 10. In some embodiments, the color difference (ΔE*ab) is less than about 8. In some embodiments, the color difference (ΔE*ab) ranges from about 0.5 or about 1, to about 8. The toning layer 10 has an infrared transmittance different than the average IR transmittance of the marking layer. For example, the difference (in percentage (%)) between the average IR transmittance of the marking layer 1 and the average IR transmittance of the toning layer is at least about 1% or at least about 3%, and preferably is less than about 80% or less than about 65%.

The toning layer may optionally contain a coloring agent and/or a binder. The type and amount of coloring agent can be modified appropriately to obtain a chromaticity close to that of the marking layer (i.e., color match). Known pigments and dyes can be used as the coloring agent. Examples of such pigments include, but are not limited to, inorganic or organic pigments such as titanium oxide, carbon black, zinc sulfide, lampblack, chrome yellow, red iron oxide, phthalocyanine blue, phthalocyanine green, brilliant carmine 6B, lake red C, and combinations thereof. Examples of dyes include, but are not limited to, carbonium dye, indigo dye, metal complex dye, naphthol dye, azo dye, anthraquinone dye, nitroso dye, quinoimine dye, cyanine dye, quinoline dye, nitro dye, naphthoquinone dye, benzoquinone dye, naphthalimide dye, phthalocyanine dye, perinone dye, and combinations thereof. Binders similar in composition to the binders listed above for the marking layer 1 may be used. The toning layer may further contain CWO particles within a range that does not affect the visibility of the marking layer 1 under infrared radiation. In this case, to prevent the loss of marking layer recognition by infrared rays, the difference (in weight %) between the CWO content in the marking layer and the CWO content in the toning layer may be, for example, at least about 1 weight % and at least about 3 weight %, and less than about 40 weight % and less than about 35 weight %. In some embodiments, the toning layer may also function as an infrared absorber layer.

In some embodiments, toning layer 10 is provided as a discontinuous layer, such as, for example, as stripes, dots, or any other pattern and/or shape.

Thickness of the license plate sheet is at least about 20 µm or at least about 50 µm. In some embodiments, the license plate sheet will undergo mechanical operations such as embossing or debossing, and should withstand such operations without formation of cracks while maintaining good tracking with the embossed shape or debossed shape of the sheet. In such embodiments the thickness of the license plate sheet may be less than about 500 µm or less than about 400 µm. Thickness, as used herein, is a value measured using a TECLOCK PC-465N from Tester Sangyo Co., Ltd., or an equivalent device.

Tensile strength of license plate sheets according to the present application is at least about 5 N/25 mm, or at least about 10 N/25 mm, or at least about 20 N/25 mm. In some embodiments, for manufacturing purposes, the tensile strength of the license plate sheet is less than about 200 N/25 mm, or less than about 175 N/25 mm, or less than about 150 N/25 mm. In a preferred aspect, the tensile strength of each layer (excluding coating compositions and adhesive layers) forming the license plate sheet is within the aforementioned range.

Elongation of license plate sheets described herein is at least about 30% or at least about 35%, to prevent delamination of the license plate sheet from the base plate, and breaking or cracking during embossing or debossing. In some embodiments, greater mechanical strength is desired and the license plate sheet has an elongation of less than about 400% or less than about 350%. In a preferred aspect, the elongation of each layer (excluding coating compositions and adhesive layers) forming the license plate sheet is within the aforementioned range.

The license plate sheet can be manufactured using various known techniques to one skilled in the art. One exemplary manufacturing method is described as follows, based on the example of the license plate sheet 310f shown in FIG. 3f. A marking composition 1 comprising CWO particles and a binder is coated onto a portion of one surface of the substrate 5. The composition is allowed to dry, forming marking layer 1. A mask is placed on the marking layer 1 and a toning layer is formed by coating a toning composition comprising particles of CWO (at a lower concentration than in the marking layer composition) and a binder, around the marking material 1 (i.e., over the portions of the substrate 5 not occupied by marking layer 1). The toning composition is allowed to dry, forming toning layer 10. Alternatively, the toning composition may be applied first to the substrate (the substrate may or may not have a mask disposed thereon) and the marking composition may be applied second. The marking composition and/or the toning composition may be applied using printing methods known to one skilled in the art, such as, but not limited to, offset printing, gravure printing, silk screen printing, ink jet printing, and the like. An overlaminate film 3 is provided and printing layer 2 formed on a portion of one surface of the overlaminate film 3 using any conventional printing technique. Shielding layer 11 is then formed over printing layer 2 and over portions of the overlaminate film 3 which do not have the printed layer disposed thereon, as shown in FIG. 3f. The shielding layer 11 is then laminated to the toning layer 10 by means of the second adhesive layer 4, forming license plate sheet 310f.

License plate laminate 320f comprises the license plate sheet 310f and a base plate 7. Typically, the base plate 7 is a metal sheet or a polymer sheet. Examples of a metal sheet include, but are not limited to, aluminum sheet, stainless steel sheet, iron sheet, and the like. Examples of suitable polymer sheets include at least one of, but are not limited to, polycarbonate sheet, polyester sheet, vinyl chloride sheet, and the like.

The license plate laminate may be cut out using, for example, a die. A license plate is then prepared by providing plate identifiers on the light incident face of the license plate laminate 310f. Plate identifiers may be, for example, alphanumeric characters. Plate identifiers may be formed by printing on the display area or embossing the license plate laminate. A protective clear coat may optionally be disposed over the display area of the license plate.

Although depths of the embossed portion and the debossed portion are generally within a range from about 1.0 mm to about 2.0 mm, they are not necessarily limited thereto.

Figure 6:
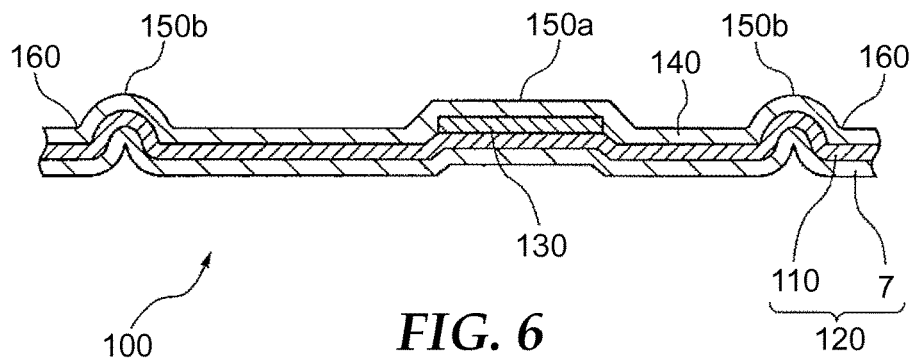
FIG. 6 is a cross section showing a license plate according to one aspect of the present application.

FIG. 6 is a cross section of an exemplary license plate according to the present application. License plate 100 can be manufactured as follows. License plate sheet 110 is applied to the base plate 7 to form license plate laminate 120. An adhesive layer (not shown) may be used to secure license plate sheet 110 to the base plate 7. The surface of the base plate 7 on which the license plate sheet is disposed may be subjected to surface preprocessing (for example, roughening processing, coating processing, and the like).

The license plate 100 has embossed portions 150a and 150b, and/or a debossed portion 160. When the base plate 7 is a metal sheet, the license plate laminate 120 is die cut, and male and female dies are used to emboss and/or deboss using a press machine. In this case, an adequate embossing/debossing speed is generally about 5 seconds. Alternatively, when the base plate 7 is a polymer sheet, license plate sheet 110 is applied to the preformed polymer sheet having embossed and/or a debossed portions already formed. The excess license plate sheet not needed for the license plate is then trimmed.

In a preferred embodiment, the embossed portion corresponds to the display area of the license plate (as indicated by embossed portion 150a in FIG. 6) and/or the license plate periphery (as indicated by embossed portion 150b in FIG. 6). The embossed portions protrude toward the light incident face side, that is, toward the observer of license plate 100. In a one embodiment, the debossed portion corresponds to the laterals of the license plate (as indicated by the debossed portion 160 in FIG. 6).

Next, a coating composition is applied by roll coating and dried, to form a coating film 130 on the desired portion (preferably on the embossed portion 150a) of the license plate sheet 110. A clear coat 140 is disposed over the entire surface of the license plate, as desired. The coating film 130 and the clear coat 140 can be formed using known paints and coating agents.

In the license plate laminate 120 and in the license plate 100, the adhesive strength between the base plate 7 and the license plate sheet 110 are preferably at least about 5N/25 mm or at least about 10N/25 mm. Typically, the higher the adhesive strength, the better. However, in some embodiments, it may be easier to manufacture a license plate laminate and/or license plate if the adhesive strength is less than about 35N/25 mm or less than about 30N/25 mm. In the present disclosure, the adhesive strength is measured as the adhesive strength measured when delamination occurs between layers of the license plate laminate. The adhesive strength is measured at a 180 degree peel angle and a peel speed of 300 mm/min, in accordance with the procedure outlined in JIS Z 0237. The adhesive strength between layers of the license plate sheet are preferably within the aforementioned range.

In some embodiments of a license plate, when the substrate 5 is white, cap-Y of at least a portion of the license plate sheet is normally greater than about 35 or is at least about 40, and normally less than about 95 or less than about 90.

Decorative components for license plates such as license plate frames or bolt covers can be formed using the license plate sheets of the present disclosure.

EXAMPLES

Below, embodiments and comparative examples will be cited to further describe aspects of the present application, but the present application is not limited to these embodiments.

Test Methods

Weather resistance (appearance, visibility, and color difference)(Embodiment 1 and Comparative Example 1): measurements were made using a TECLOCK PC-465N from Tester Sangyo Co. Samples of license plate laminates prepared as described in Embodiment 1 and Comparative Example 1 were exposed to an irradiation intensity of 80 mW/cm² for 100 hours, with a metal halide lamp as the light source. Before and after testing, digital camera images were shot of the samples using a Lumix DMC-FZ1, digital camera made by Panasonic. Infrared camera images were shot of the samples using a DCR-PC100, digital video camera recorder made by Sony, in the night shot mode, after covering the lens portion with a visible light-cutting, infrared-transmitting filter. In addition, a CM-3700d spectrophotometer made by Minolta was used to measure the color difference (ΔE*ab) of samples before and after testing.

Whiteness Weather Resistance Test (Embodiment 3): Samples were inserted into a sunshine carbon-type accelerated weather resistance testing apparatus, and the color difference (ΔE*ab) of a white portion of a license plate sheet prepared as described in Embodiment 3, before and after the elapse of about 2000 hours, was measured using a CM-3700d spectrophotometer made by Minolta.

Reflective Performance (Embodiment 3): Retroreflectivity (brightness) was measured in accordance to the procedure generally outlined in JIS Z 9117.

Whiteness (Embodiment 3 and Comparative Examples 2 and 3): Whiteness of the marking layer was measured using an SPM50 spectrophotometer made by GreytagMacbeth Co.

Color Difference (ΔE*ab) (Embodiments 3 to 8 and Comparative Examples 2 and 3)): For both the marking layer and the substrate, measurements were made using the SPM50 spectrophotometer.

Marking Reading Test (Embodiments 2 to 8 and Comparative Examples 2 and 3): An ALPR system using a PowerShot SX110IS digital camera and an OC-i System portable license plate automated scanner made by A-TEC Co.

An exemplary overlaminate film and second adhesive layer were prepared as described below.

Preparation of Acrylic Resin Solution A

An acrylic resin 1 (provided as an ethyl acetate solution, where the composition ratio of methyl methacrylate (MMA)/butyl methacrylate (BMA)/dimethylaminoethyl methacrylate (DMAEMA) was 60:34:6 (weight ratio); the average molecular weight (MW) was about 70,000; and Tg was about 66° C.) was prepared as a (meth)acrylic polymer containing an amino group. An acrylic resin 2 (provided as an ethyl acetate solution, where the composition ratio of butyl acetate (BA)/2-ethyl hexyl acrylate (2EHA)/vinyl acetate (VAc)/acrylic acid (AA) was 40:47:8:5; Tg was about −51° C.; and the MW was about 550,000) was prepared as a (meth)acrylic polymer containing a carboxyl group. Acrylic resin solution A was prepared by mixing acrylic resin 1 and acrylic resin 2, at a mixture ratio of 100 parts by weight of acrylic resin 1 and 70 parts by weight of acrylic resin 2. The solid content of the acrylic resin solution A was 32 weight %.

Preparation of Overlaminate Film (Printable Clear Film)

An overlaminate film 3 was prepared using a printable composition. About 100 parts by weight of the acrylic resin 1 and 50 parts by weight of acrylic resin 2, prepared as described in "Preparation of Acrylic Resin Solution A", above, were mixed. About 3 parts by weight of a cross linking agent 1 (E-AX, epoxy cross linking agent made by Soken Chemical & Engineering Co., Ltd.) were added to 100 parts by weight of the acrylic resin mixture. The mutual compatibility of the polymers was satisfactory. The overlaminate film 3 having a thickness of 50 µm was obtained by using a knife coater to apply the aforementioned composition to the release treatment surface of a release treated polyester film (base) having a thickness of 50 µm, and then drying and cross-linking for 3 minutes at 95° C. and for 2 minutes at 155° C.

Preparation of Second Adhesive Layer

A second adhesive layer composition was prepared by mixing 100 parts by weight of an alkyd resin 1 (Tessrack 2055-66, alkyd resin, made by Hitachi Chemical Co., Ltd.) and 35 parts by weight of an urea-formaldehyde resin 2 (ML-11HI(65), butyl etherified urea and formaldehyde resin, made by Hitachi Chemical Co., Ltd.). About 50 parts by weight of microspheres 1 (Chemisnow MR-20G, acrylic microspheres made by Soken Chemical & Engineering Co.; average volume particle size: Dv 21 µm) were added to and mixed with 100 parts by weight of the adhesive layer composition, thereby yielding a composition containing non-adhesive microspheres. A back surface resin layer was obtained by using a knife coater to apply a solution containing the obtained non-adhesive microspheres to a side opposite a transparent receptor side of the base, to obtain a coating weight of 15 g/m², after which this was dried and cross linked for 3 minutes at 95° C. and 3 minutes at 155° C.

Comparative Example 1

A retroreflective substrate was coated with a marking layer composition comprising a dispersion obtained by mixing the ingredients listed in Table 1. The coating was dried to form the comparative license plate sheet 1. A separate marking layer was formed by applying the marking layer composition fo a PET film (HPE-25 PET film, commercially available from Teijin DuPont Films) and allowed to dry. The dried thickness of the separate marking layer was about of 25 µm. This separate marking layer was prepared so that average transmittance (IR and visible) of the marking layer could be measured, using a JASCO V-570 spectrophotometer made by JASCO Corp. Results are reported in Table 1, below. In each example discussed below, the same method was used to measure average transmittance.

Embodiment 1

License plate sheet 2 was prepared as described in Comparative Example 1, except that the marking layer material was formed using a dispersion obtained by mixing the ingredients listed in Table 1, below, wherein WP stands for parts by weight.

Figures 1, 7A:
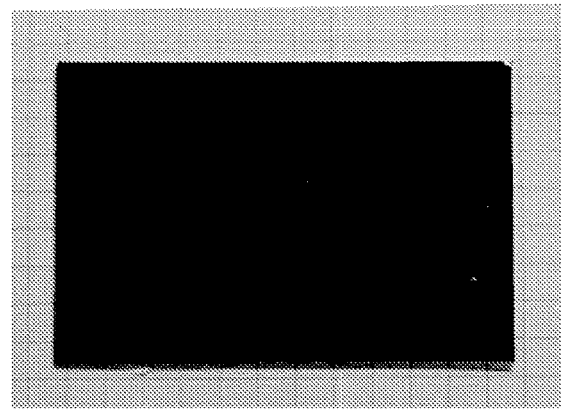
FIGS. 7a-1, 7a-2, 7b-1 and 7b-2 are digital pictures of the license plate sheet prepared as described in Comparative Example 1.
Figures 2, 7A:
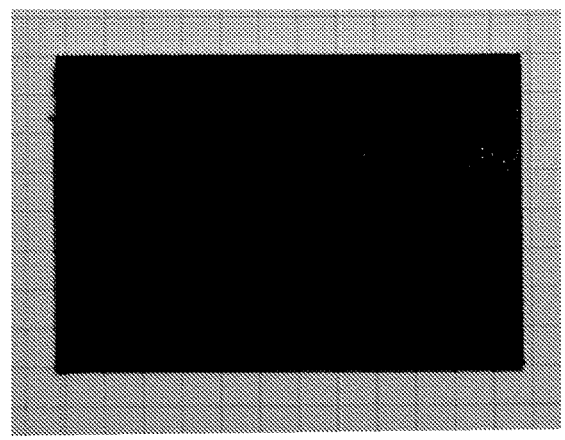
Figures 1, 7B:
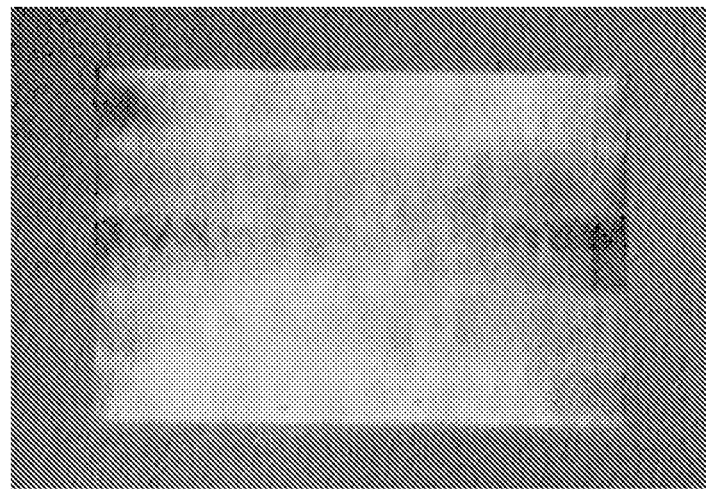
Figures 2, 7B:
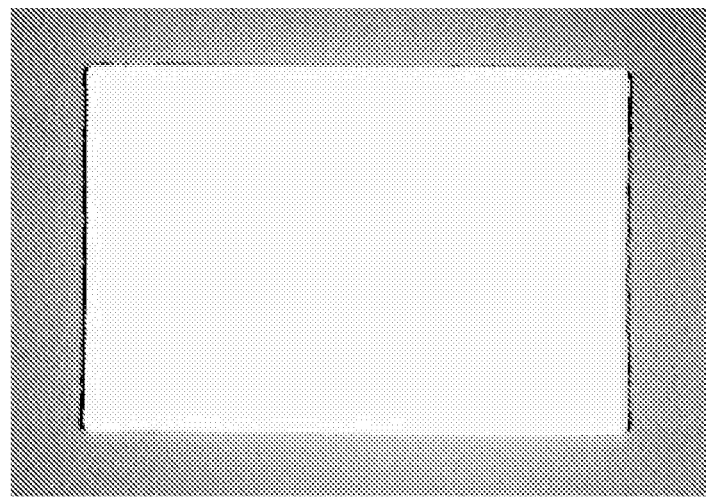
Figures 1, 7C:
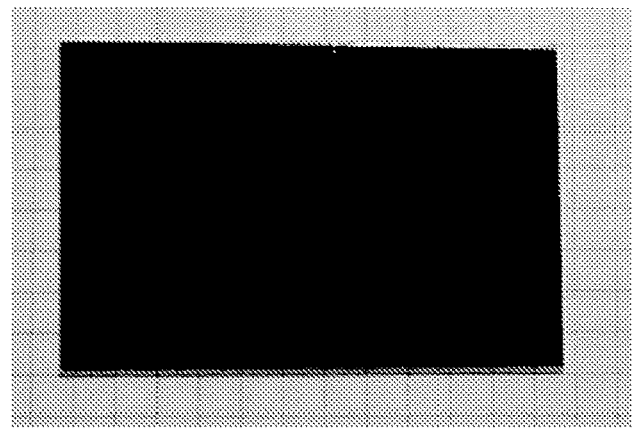
Figures 2, 7C:
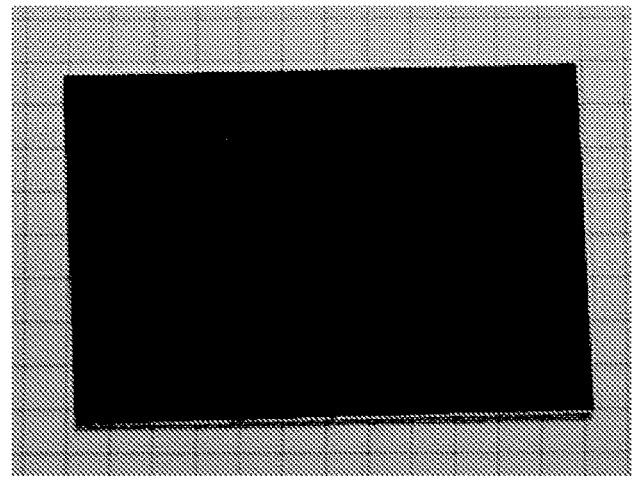
Figures 1, 7D:
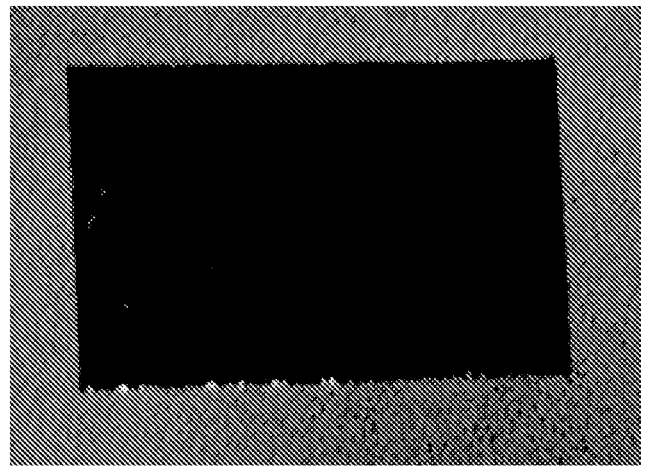
Figures 2, 7D:
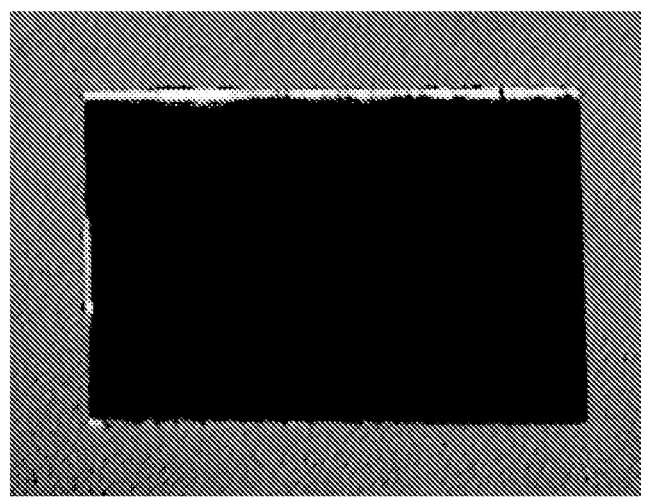

Comparative license plate sheet 1 and license plate sheet 2 were subjected to the weather resistance test described above. FIG. 7 shows the results of the weather resistance tests in Embodiment 1 and Comparative Example 1. FIGS. 7a and 7b show the test results for comparative license plate sheet 1 (Comparative Example 1), and FIGS. 7c and 7d show the test results for license plate sheet 2 (Embodiment 1). FIGS. 7a-1, 7a-2, 7c-1, and 7c-2 are pictures taken with a digital camera. FIGS. 7b-1, 7b-2, 7d-1, and 7d-2 are pictures taken with an infrared camera. FIGS. 7a-1, 7b-1, 7c-1, and 7d-1 show the license plate sheets before the weathering test. FIGS. 7a-2, 7b-2, 7c-2, and 7d-2 show the samples after the 100-hour test. Halation occurred in the infrared camera pictures taken of comparative license plate sheet 1, especially after weathering (as seen by bright spots in FIGS. 7b-1 and 7b-2). In contrast, FIGS. 7d-1 and 7d-2 are pictures of the license plate sheet 2 under IR. No halation is observed, and infrared absorbency was maintained before and after testing. The color difference (ΔE*ab) was calculated based on the chromaticity measured before and after the test. The materials used in the aforementioned example and the evaluation results are listed in Table 1.

TABLE 1

|  |  | Reference Figure | Embodiment 1<br>FIGS. 7c and 7d | Comparative<br>Example 1<br>FIGS. 7a and 7b |
|---|---|---|---|---|
| License<br>plate sheet |  | Thickness (with adhesive layer<br>provided on substrate) | 155 μm | 160 μm |
|  |  | Thickness (without adhesive layer<br>provided on substrate) | 105 μm | 110 μm |
| Substrate |  | Retroreflective/non-retroreflective<br>Material name | Retroreflective<br>3M Reflective Sheet<br>BR190500 | Retroreflective<br>3M Reflective Sheet<br>BR190500 |
|  |  | Thickness | 140 μm | 140 μm |
| Marking<br>layer |  | Solvent | Acrylic resin solvent A | 3M Clear Solvent<br>GA-3 |
|  | IR absorber | Material name | CWO infrared absorber<br>YMF-02A | Soluble<br>phthalocyanine<br>pigment IR-10A |
|  |  | Concentration | 100 WP solvent: 18.3 WP<br>IR absorber | 1 weight % |
|  |  | Thickness (dried) | 15 μm | 20 μm |
|  |  | Average visible transmittance | 67.2% | 64.8% |
|  |  | Average IR transmittance | 16.0% | 47.1% |
|  | Color difference between base and marking layer<br>(viewed with naked eye) |  | 0.56 | 20.41 |

Embodiment 2A

With the periphery of the character "3" masked, a marking layer was formed using a dispersion obtained by mixing the ingredients listed in Table 2, below. A uniform coat was applied to the substrate and then dried, thereby forming a security mark (as a marking layer). Next, a printing layer was provided by printed on a transparent film. A second adhesive layer was laminated to the printing layer side of the transparent film. The obtained sheet was attached to the substrate, with the security mark and the printing layer facing each other via the adhesive layer, forming a license plate sheet.

A laminator was used to attach the license plate sheet to a base plate, and the unnecessary sheet was trimmed Male and female dies were used to emboss the base plate with characters and a number at a height of 1.1 mm (specifically, the characters "Tama" and "a" as well as "42"). The embossed portion was coated with an ink, which was dried, to form a coating composition. A clear coat solution was applied over the entire surface of the license plate sheet and then dried, forming a clear coat. In this manner a license plate was obtained. The embossed portion of the obtained license plate was visually examined.

Embodiment 2B

A hand coater was used to apply the infrared absorbing layer material, which was a dispersion obtained by mixing the ingredients listed in Table 2, to the substrate, thereby forming an infrared absorbing layer. A marking layer was formed on the infrared absorbing layer using a marking composition prepared using the ingredients listed in Table 2, below. A printer was used to print shielding layer comprising a white striped pattern (width: 200 μm; spacing 500 μm) on a transparent film. A second adhesive layer was formed on the opposite side of the transparent film, and placed in contact with the substrate comprising the infrared absorbing layer and the security mark. In this manner, a license plate sheet was obtained. This license plate sheet was used to manufacture license plates using the procedure described in Embodiment 2A. The embossed portion of the obtained license plate was visually inspected. The materials used in the above examples and the evaluation results are listed in Table 2, below.

Embodiment 3

A hand coater was used to apply the infrared absorbing layer material, which was a dispersion obtained by mixing the ingredients listed in Table 3, to the substrate, thereby forming an infrared absorbing layer. The method of Embodiment 2A was used to manufacture the security mark using a marking layer material, which was a dispersion obtained by mixing the ingredients listed in Table 3. A printer was used to print a shielding layer on a transparent film. The shielding layer comprised a white striped pattern (width: 200 μm; spacing 500 μm). A second adhesive layer was disposed over the opposite surface of the transparent film, and brought into contact with the security mark and infrared absorbing layer. In this manner, a license plate sheet was obtained. A license plate was prepared using the procedure described in Embodiment 2A.

When the embossed portion of the license plate was visually examined, no cracks or creases were found in the license plate sheet. In addition, reflection performance of the white part of the license plate was 102 cd/lx/m$^2$, and in the weather resistance test of the white part, the color difference of the white part was 2.3.

Figure 8A:
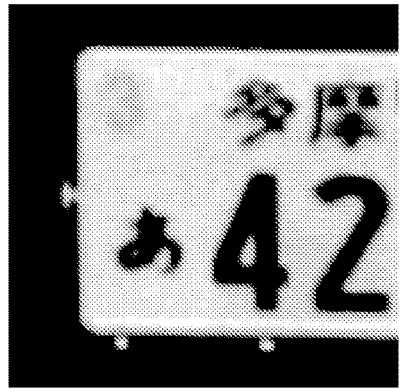
FIGS. 8a and 8b are digital pictures of the license plate prepared as described in Embodiment 2A.
Figure 8B:
Figure 9A:
FIGS. 9a and 9b are digital pictures of the license plate prepared as described in Embodiment 3.
Figure 9B:
Figure 10A:
FIGS. 10a and 10b are digital pictures of the license plate prepared as described in Embodiment 4.
Figure 10B:
Figure 11A:
FIGS. 11a and 11b are digital pictures of the license plate prepared as described in Embodiment 5.
Figure 11B:
Figure 12A:
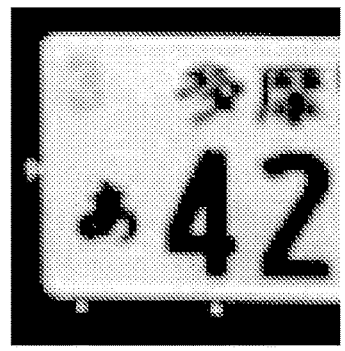
FIGS. 12a and 12 b are digital pictures of the license plate prepared as described in Embodiment 6.
Figure 12B:
Figure 13A:
FIGS. 13a and 13b are digital pictures of the license plate prepared as described in Embodiment 7.
Figure 13B:
Figure 14A:
FIGS. 14a and 14b are digital pictures of the license plate prepared as described in Embodiment 8.
Figure 14B:
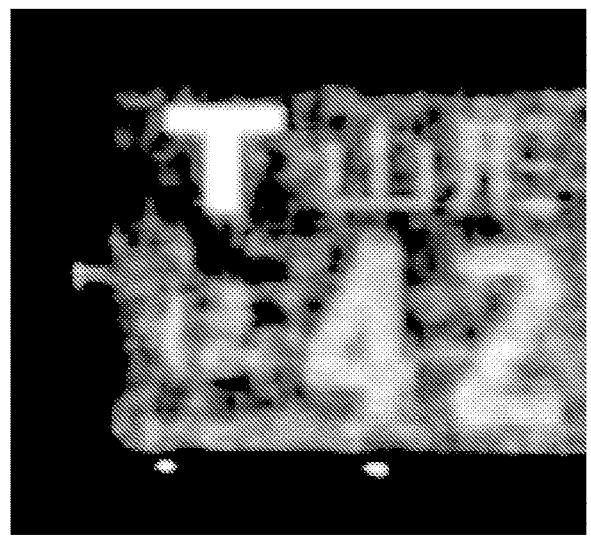

FIGS. 8a and 8b are digital pictures taken of the license plate manufactured as described Embodiment 2A, and FIGS. 9a and 9b are digital pictures taken of the license plate manufactured in Embodiment 3. FIGS. 8a and 9a, are, respectively, with an ALPR system modified for reading painted license plates under IR. FIGS. 8b and 9 b were taken with a digital camera (CANON POWERSHOT SX110IS). As shown in FIGS. 8b and 9b, the number "3" marking formed on the upper left hand corner of the license plate sheets prepared as described in Embodiment 2A and Embodiment 3 were not recognized/detected in the images taken with the digital camera under visible conditions. In contrast, the marking "3" was recognized/detected under IR, as seen in FIGS. 8a and 9a.

Comparative Example 2

A license plate sheet was prepared using an ink jet printer (JV5 made by Mimaki Engineering Co.) to print characters and numbers at 100% concentration on the substrate listed in Table 3, and a marking layer was prepared by printing the number "3" at 40% concentration using the composition described in Table 3, below. The license plate sheet was adhered to a base plate and the excess sheet was trimmed, thereby forming a license plate.

Comparative Example 3

A license plate sheet was prepared using an ink jet printer (JV5 made by Mimaki Engineering Co.) to print characters and number at 100% concentration on the substrate listed in Table 3. A marking layer was formed by printing at 50% concentration a marking composition in the shape of the number "3". The license plate sheet was adhered to a base plate and the excess sheet was trimmed, thereby forming a license plate.

For the license plates prepared as described in Embodiment 3 and Comparative Examples 2 and 3, the marking reading test was performed. Cap-Y of the marking layer as well as the color difference ΔE*ab between the marking layer and substrate were measured. The results are shown in Table 3. For the license plate prepared as described in Comparative Example 2, it was impossible to read the markings using an infrared camera. In addition, for each comparative example, the color difference between the substrate and the marking layer was large; that is, the marking was clearly visible to the naked eye, and furthermore, the cap-Y failed to reach the minimum value of 35 of ISO 7591 (retroreflective plate specifications for a street vehicle (vehicle/trailer)). On the other hand, for the license plate prepared as described in Embodiment 3 it was possible to read the markings using an infrared camera. Moreover, the color difference between the substrate and the marking layer was small and markings were invisible to the naked eye. Moreover, Cap-Y considerably exceeded 35, the minimum value of ISO 7591.

TABLE 2

| | | | Embodiment 2A | Embodiment 2B |
|---|---|---|---|---|
| | Reference Figure | | FIG. 8 | — |
| License plate sheet | Structure | | FIG. 1g | FIG. 4b |
| | Thickness (with adhesive layer provided on substrate) | | About 200 μm | About 225 μm |
| | Thickness (without adhesive layer provided on substrate) | | About 160 μm | About 185 μm |
| Substrate | Retroreflective/non-retroreflective | | Non-retro | Retroreflective |
| | Material name | | 3M graphic film IJ180-10 | 3M reflective sheet 4770 |
| | Thickness | | About 90 μm | About 120 μm |
| | Elongation | | 195% | 55% |
| Marking layer | Solvent | | Acrylic resin solvent A | Acrylic resin solvent A |
| | IR absorber | Material name | CWO IR absorber YMF-02A | CWO IR absorber YMF-02A |
| | | Concentration | 100 WP Solvent A + 50 WP MIBK: 2.2 WP | 100 WP Solvent A + 50 WP MIBK: 5.5 WP |
| | Thickness (dried) | | About 5 μm | About 5 μm |
| | Average visible transmittance | | 98.7% | 96.7% |
| | Average IR transmittance | | 90.4% | 83.4% |
| IR absorbing layer | Solvent | | None | Acrylic resin solvent A |
| | IR absorber | None | None | CWO IR absorber YMF-02A |
| | | None | None | 100 WP: 26.5 WP |
| | Thickness (dried) | | None | About 15 μm |
| | Average visible transmittance | | None | 59.0% |
| | Average IR transmittance | | None | 7.9% |
| Shielding layer | Transparent film for shielding layer | Material name | None | Gerber 220-114 (with adhesive layer) |
| | | Thickness | None | About 80 μm |
| | Shielding layer (striped pattern) | Ink name | None | Gerber Color Spot Series GCS-10 |
| | | Thickness (after drying) | None | About 5 μm |
| | | Printer name | None | EDGEII |
| Printing layer | Film | Material name | Printable clear film | None |
| | | Thickness | About 50 μm | None |
| | Graphic layer | Ink name | Mimaki Genuine Ink | None |
| | | Thickness (after drying) | About 5 μm | None |
| | | Printer name | Inkjet printer (JV5) | None |
| | Adhesive layer | Material name | Transparent acrylic resin | None |
| | | Thickness | About 40 μm | None |
| License plate | Base plate | Material name | Aluminum plate | Aluminum plate |
| | | Thickness | 1 mm | 1 mm |
| | Emboss | Depth | 1.1 mm | 1.1 mm |
| | | Ink name | 3M Roll coating 4854 | 3M Roll coating 4854 |
| | Clear coat | Material name | 3M Clear Solution GA-3 | 3M Clear Solution GA-3 |
| Cracks or creases in sheet at embossed portion | | | None | None |

TABLE 3

Color difference and Cap-Y

| | | | Embodiment 3 | Comparative Example 2 | Comparative Example 3 |
|---|---|---|---|---|---|
| | Reference Figure | | FIG. 9 | — | — |
| License plate sheet | Structure | | FIG. 4B | — | — |
| | Thickness (with adhesive layer on substrate) | | About 255 μm | About 95 μm | About 95 μm |
| | Thickness (without adhesive layer on substrate) | | About 205 μm | About 55 μm | About 55 μm |
| Substrate | Retroreflective/non-retroreflective | | Retroreflective | Non-retro. | Non-retro. |
| | Material name | | 3M reflective sheet BR190500 | 3M graphic film IJ180-10 | 3M graphic film IJ180-10 |
| | Thickness | | 140 μm | ~90 μm | ~90 μm |
| | Elongation at break | | 261% | 195% | 195% |
| Marking layer | Solvent | | Acrylic resin solvent A | None | None |
| | IR absorber | Material name | CWO infrared absorber YMF-02A | Black ink - Mimaki Genuine Ink | Black ink - Mimaki Genuine Ink |
| | | Concentration | 100 WP Solvent A + 50 WP MIBK: 5.5 WP | 40 Halftone % | 50 Halftone % |
| | Thickness (dried) | | About 5 μm | About 5 μm | About 5 μm |
| | Average visible transmittance | | 96.70% | 52.90% | 44.10% |
| | Average IR transmittance | | 83.40% | 65.10% | 59.10% |
| IR absorbing layer | Solvent | | Acrylic resin solvent A | none | none |
| | IR absorber | Material name | CWO infrared absorber YMF-02A | none | none |
| | | Concentration | 100 WP: 26.5 WP | none | none |
| | Thickness (dried) | | About 15 μm | none | none |
| | Average visible transmittance | | 59.00% | none | none |
| | Average IR transmittance | | 7.90% | none | none |
| Shielding layer | Film | Material name | Gerber 220-114 (with adhesive layer) | none | none |
| | | Thickness | About 80 μm | none | none |
| | Striped pattern | Ink name | Gerber Color Spot Series GCS-10 | none | none |
| | | Thickness dried) | About 5 μm | none | none |
| | | Printer name | EDGE II | none | none |
| License plate | Base plate | Material name | Aluminum plate | Aluminum plate | Aluminum plate |
| | | Thickness | 1 mm | 1 mm | 1 mm |
| | Emboss | Depth | 1.1 mm | none | none |
| | | Ink name | 3M Roll coating 4854 | Black ink - Mimaki Genuine Ink | Black ink - Mimaki Genuine Ink |
| | Clear coat | Material name | 3M Clear Solution GA-3 | none | none |
| Reading of marking by infrared camera | | | Readable | Impossible | Readable |
| Cap-Y of marking layer | | | 44 | 33.8 | 23.1 |
| Color difference between base and marking layer (viewed with naked eye) | | | 1.4 | 23.5 | 32.9 |

Embodiment 4

A license plate sheet was prepared by forming a marking layer on a substrate. The marking layer (security mark) was formed using a dispersion obtained by mixing the ingredients listed in Table 4a, following the procedure described in Embodiment 2A The color difference (ΔE*ab) between the security mark (marking layer) and the substrate of the license plate was measured. Values of the color differences in Embodiments 4 through 8 were estimated using the following method. Binders containing various amounts of CWO particles, 10 g of acrylic resin solution A, and 5 g of a dilute solvent (methyl isobutyl ketone) were applied, and 7 films (thickness: 8 to 10 μm) having respective CWO infrared absorber concentrations of 0.05, 0.01, 0.2, 0.3, 0.6, 0.9, and 1.2 weight % were prepared. The ΔE*ab of each applied film was measured, and a calibration curve plotting the relationship between ΔE*ab and the CWO infrared absorber concentration was prepared. The ΔE*ab value of the security mark was estimated from the CWO infrared absorber concentration in the security mark, the CWO infrared absorber concentration in the base (namely, 0 weight %), and this calibration curve.

Next, a graphic layer (printing layer) was printed on a transparent film. An adhesive layer was disposed on the opposite side of the transparent film, then brought into with the security mark and substrate. The back side of an overlaminate film is adhered to the printing layer and transparent film by means of an adhesive layer. The license plate sheet obtained was adhered to a base plate, and a license plate was obtained by the same method as in Embodiment 2A. The license plate was subjected to a marking reading test.

Embodiment 5

A license plate sheet was prepared by forming a marking layer (security mark) using a dispersion obtained by mixing the ingredients listed in Table 4a, on a substrate, as described in Embodiment 2A. The color difference (ΔE) between the security mark and substrate was measured. Next, the graphic layer (printing layer) was printed over the security mark. The backside of an overlaminate film was adhered to the printing layer by means of an adhesive layer. A license plate laminate was provided by adhering the license plate sheet to a base plate, and other than the fact that the characters and numbers differed, a license plate was obtained using the same method described in Embodiment 2A. The license plate was subjected to a marking reading test.

Embodiment 6

A license plate sheet was prepared by forming a marking layer (security mark) using a dispersion obtained by mixing the ingredients listed in Table 4a, on a substrate, as described in Embodiment 2A. A graphic layer (printing layer) was printed on a printable clear film. A back surface resin layer was formed on the graphic layer and brought into contact with the substrate, such that the security mark and the graphic layer were separated by the back surface resin layer. The license plate sheet was dried in an oven and subsequently applied to a base plate, to form a license plate laminate. A license plate was prepared using the procedure described for Embodiment 2A. The license plate was subjected to a marking reading test.

Embodiment 7

A license plate sheet was prepared by forming a graphic layer (printing layer) on a substrate. Next, a security mark (marking layer) was printed on a printable clear film and dried. The marking material was formed using a dispersion obtained by mixing the ingredients listed in Table 4b. The color difference between the security mark and the substrate was evaluated by the calibration curve method.

Next, a back surface resin layer was applied to the substrate with the security mark, followed by applying the printable clear film with the security mark to the substrate, so that the security mark and the graphic layer opposed each other via the back surface resin layer. This license plate sheet was applied to a base plate, and other than the fact that the numbers and characters differed, a license plate was obtained using the method described in Embodiment 2A. The license plate was subjected to a marking reading test.

Embodiment 8

With the periphery of the character "T" masked, an infrared absorbing material, which was a dispersion obtained by mixing the ingredients listed in Table 4, was used to uniformly coat a substrate, and then dried, thereby forming a security mark (as the marking layer). Next, with the character "T" masked, the infrared absorbing material, which was a dispersion obtained by mixing the ingredients listed in Table 4b, was used to uniformly coat the substrate, thereby forming a toning layer. A printer was used to print numbers and characters having a green solid color and a white striped pattern (width: 200 μm; spacing 500 μm) as a shielding layer, on the side where the adhesive layer of a transparent film (with adhesive layer) for the shielding layer was not adhered, and the adhesive layer of the transparent film was attached to the substrate with security mark, which was manufactured as aforementioned. A license plate sheet was obtained by applying to this the overlaminate film listed in Table 4b. A license plate was obtained by using a laminator to apply this license plate sheet to a blanked base plate, and then trimming the unnecessary sheet. The license plate was subjected to a marking reading test.

FIGS. 10 through 14 show the results of the marking reading tests of license plates manufactured as described in Embodiments 4 through 8, respectively. FIGS. 10a, 11a, 12a, 13a, and 14b show pictures taken under IR by an ALPR system. FIGS. 10b, 11b, 12b, 13b, and 14a show pictures taken under visible conditions by the digital camera. As shown in FIGS. 10 through 14, in the license plate manufactured in each embodiment, the marking of the number "3" or the character "T" was formed at the top left, and this marking was not recognized in the image of the digital camera, but was recognized in the image of the ALPR system modified for reading a painted type license plate.

TABLE 4a

Tests of reading in visible light range and infrared light range

| | Reference figure: | | Embodiment 4<br>FIG. 10 | Embodiment 5<br>FIG. 11 | Embodiment 6<br>FIG. 12 |
|---|---|---|---|---|---|
| License plate sheet | Structure | | FIG. 1f | FIG. 1d | FIG. 1g |
| | Thickness (with adhesive layer on substrate) | | ~260 μm | ~180 μm | ~200 μm |
| | Thickness (without adhesive layer on substrate) | | ~220 μm | ~140 μm | ~160 μm |
| Substrate | Retroreflective/non-retroreflective | | Non-retro. | Non-retro. | Non-retro. |
| | Material name | | 3M graphic film IJ180-10 | 3M graphic film IJ180-10 | 3M graphic film IJ180-10 |
| | Thickness | | ~90 μm | ~90 μm | ~90 μm |
| | Elongation | | 195% | 195% | 195% |
| Marking layer | Solvent | | Acrylic resin solvent A | Acrylic resin solvent A | Acrylic resin solvent A |
| | IR absorber | Material name | CWO IR absorber YMF-02A | CWO IR absorber YMF-02A | CWO IR absorber YMF-02A |
| | | Concentration | 100 WP Solvent A + 50 WP MIBK: 1.7 WP | 100 WP Solvent A + 50 WP MIBK: 2.1 WP | 100 WP Solvent A + 50 WP MIBK: 1.4 WP |
| | Thickness (dried) | | ~5 μm | ~5 μm | ~5 μm |
| | Average visible transmittance | | 99.10% | 98.80% | 99.20% |
| | Average IR transmittance | | 91.40% | 90.60% | 92.10% |

TABLE 4b

Tests of reading in visible light range and infrared light range

Figure 5C:
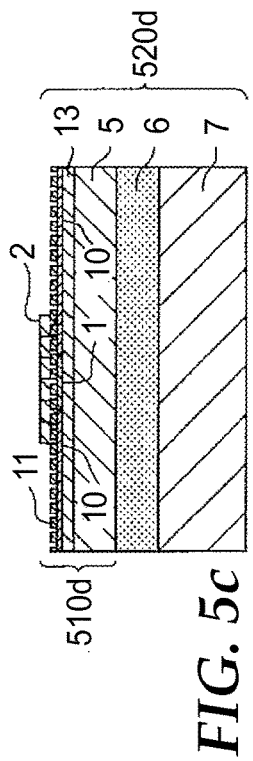
FIGS. 5(a) through 5(e) depict cross sections of license plate sheets and license plate laminates according to one aspect of the present application.
Figure 5D:
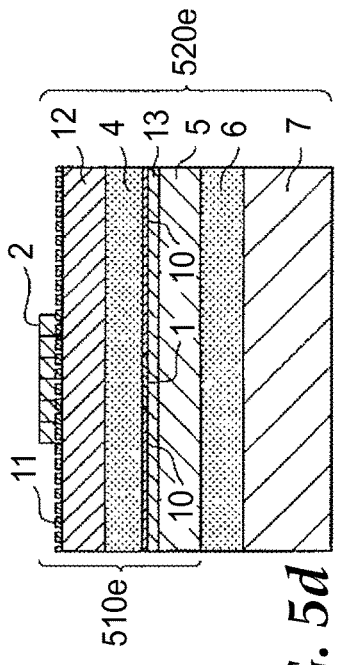
Figure 5E:
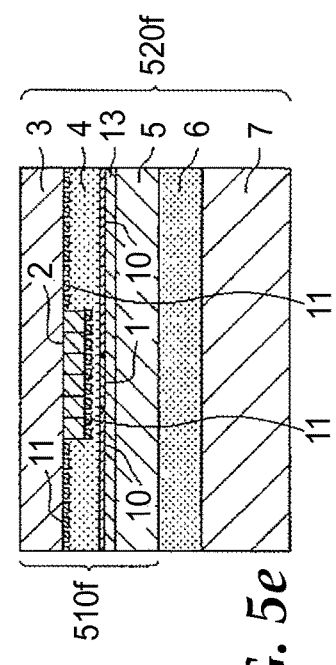
Figure 5A:
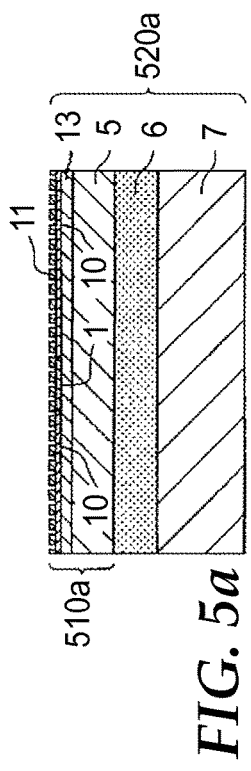
Figure 5B:
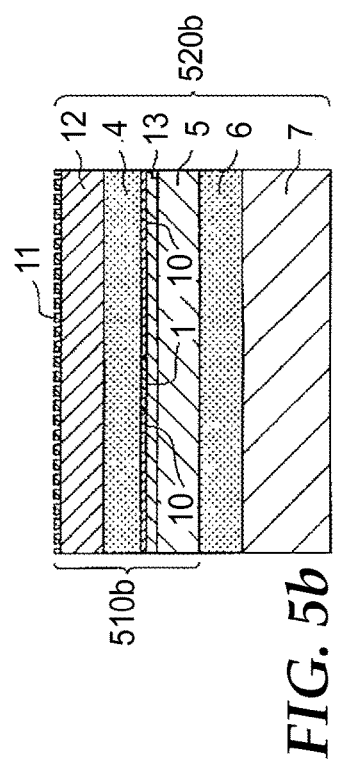
Figure 5C:
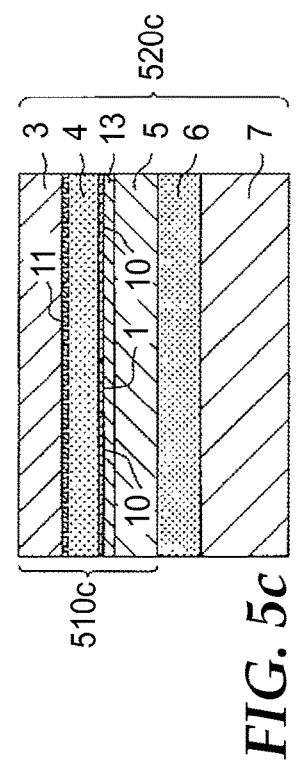

| | | Embodiment 7 | Embodiment 8 |
|---|---|---|---|
| Reference figure: | | FIG. 13 | FIG. 14 |
| License plate sheet | Structure | FIG. 1h | FIG. 5b (No IR absorbing layer 13) |
| | Thickness (with adhesive layer provided on substrate) | ~200 μm | ~325 μm |
| | Thickness (without adhesive layer provided on substrate) | ~160 μm | ~275 μm |
| Substrate | Retroreflective/non-retroreflective | Non-retro. | Retro. |
| | Material name | 3M graphic film IJ180-10 | 3M reflective sheet BR190500 |
| | Thickness | ~90 μm | ~140 μm |
| | Elongation | 195% | 261% |
| Marking layer | Solvent | Acrylic resin solvent A | Acrylic resin solvent A |
| | IR absorber Material name | CWO IR absorber YMF-02A | CWO IR absorber YMF-02A |
| | Concentration | 100 WP Solvent A + 50 WP MIBK: 1.8 WP | 100 WP: 12.8 WP |
| | Thickness (after drying) | ~5 μm | ~15 um |
| | Average visible transmittance | 99.00% | 73.00% |
| | Average IR transmittance | 91.20% | 23.50% |
| Toning layer | Solvent | None | Acrylic resin solvent A |
| | IR absorber Material name | None | CWO IR absorber YMF-02A |
| | Concentration | None | 100 WP: 26.5 WP |
| | Thickness (after drying) | None | ~15 μm |
| | Color difference from marking layer (ΔE) | None | 7.1 |
| | Average visible transmittance | None | 59.00% |
| | Average IR transmittance | None | 7.90% |

TABLE 5a

Tests of reading visible light range and infrared light range

| | | | Embodiment 4 | Embodiment 5 | Embodiment 6 |
|---|---|---|---|---|---|
| Reference figure: | | | FIG. 10 | FIG. 11 | FIG. 12 |
| LP sheet | Structure | | FIG. 1f | FIG. 1d | FIG. 1g |
| Printing layer | Film | Material name | Gerber 220-114 (with adhesive layer) | None | Printable clear film |
| | | Thickness | ~80 μm | — | ~50 μm |
| | Graphic layer | Ink name | Mimaki Genuine Ink | Mimaki Genuine Ink | Mimaki Genuine Ink |
| | | Thickness (after drying) | ~5 μm | ~5 μm | ~5 μm |
| | | Printer name | Ink jet printer JV5 | Ink jet printer JV5 | Ink jet printer JV5 |
| | Adhesive layer | Material name | None | None | Transparent acrylic resin |
| | | Thickness | None | None | ~40 μm |
| | Overlaminate film | Material name | 3M Digital LP Clear Protective Film 9097 (with adhesive layer) | 3M Digital LP Clear Protective Film 9097 (with adhesive layer) | None |
| | | Thickness | ~70 μm | ~70 μm | None |
| License plate | Base | Material name | Aluminum plate | Aluminum plate | Aluminum plate |
| | | Thickness | 1 mm | 1 mm | 1 mm |
| | Emboss | Depth | 1.1 mm | 1.1 mm | 1.1 mm |
| | | Ink name | 3M Roll coating 4854 | 3M Roll coating 4854 | 3M Roll coating 4854 |
| Color difference between base and marking layer | | | 2.4 | 3.0 | 2.0 |
| Marking reading test | | | Readable | Readable | Readable |

TABLE 5b

| Reference figure: | | | Embodiment 7<br>FIG. 13 | Embodiment 8<br>FIG. 14 |
|---|---|---|---|---|
| LP sheet | | Structure | FIG. 1g | FIG. 5b (No IR absorbing layer 13) |
| Shielding layer | Film | Material name | None | Gerber 220-114 (with adhesive layer) |
| | | Thickness | None | ~80 μm |
| | Shielding layer (striped pattern) | Ink name | None | Stripes: Gerber Color Spot Series GCS-10<br>Background (solid green): Gerber Color Process Series GCP-705/GCP-707 |
| | | Thickness (after drying) | None | ~5 μm |
| Printing layer | Film | Printer name | None | EDGE II |
| | | Material name | Printable clear film | None |
| | | Thickness | ~50 μm | None |
| | Graphic layer | Ink name | Mimaki Genuine Ink | None |
| | | Thickness (after drying) | ~5 um | None |
| | | Printer name | Ink jet printer JV5 | None |
| | Adhesive layer | Material name | Transparent acrylic resin | None |
| | | Thickness | ~40 μm | None |
| Overlaminate film | | Material name | Overlaminate film prepared as described above | 3M Digital LP Clear Protective Film 9097 (with adhesive layer) |
| | | Thickness | Not available | ~70 μm |
| License plate | Base plate | Material name | Aluminum plate | Aluminum plate |
| | | Thickness | 1 mm | 1 mm |
| | Emboss | Depth | 1.1 mm | None |
| | | Ink name | 3M Roll coating 4854 | None |
| Color difference between substrate and marking layer | | | 2.5 | 1.9 |
| Marking reading test | | | Readable | Readable |

(Suppliers of materials listed in Tables 1 to 5)

Soluble phthalocyanine pigment IR-10A: Commercially available from Nippon Shokubai Co., Ltd.
Clear Solution GA-3: Commercially available from 3M Corporation.
CWO infrared absorber YMF-02A: Commercially available from Sumitomo Metal Mining Co., Ltd.
3M reflective sheet BR190500: Commercially available from 3M Corporation.
3M graphic film IJ180-10: Commercially available from 3M Corporation.
3M reflective sheet 4770: Commercially available from 3M Corporation.
Gerber 220-114 (with adhesive layer): Commercially available from Gerber Scientific, Inc.
Gerber Color Spot Series GCS-10: Commercially available from Gerber Scientific Inc.
Gerber Color Process Series GCP-705/GCP-707: Commercially available, from Gerber Scientific Inc.
EDGE II: Scotch Master made by 3M Corporation.
Mimaki Genuine Ink: Commercially available from Mimaki Engineering Co., Ltd.
Ink jet printer JV5: Made by Mimaki Engineering Co., Ltd.
3M roll coating 4854: Commercially available from 3M Corporation.
3M Digital License Plate Clear Protective Film 9097 (with adhesive layer):
Commercially available from 3M Corporation.

FIELD OF INDUSTRIAL USE

The present application is preferably applicable to various license plates that require a marking layer for such purposes of counterfeiting prevention, improvement in readability, and the like

What is claimed is:

1. A license plate sheet comprising:
a substrate comprising one of a beaded sheeting and a prismatic sheeting; and
a marking layer comprising cesium tungsten oxide particles and a binder.

2. The license plate sheet of claim 1, wherein the marking layer is disposed on at least a portion of the substrate.

3. The license plate sheet according to claim 1, further comprising at least one of an infrared absorbing layer, a printing layer, a toning layer and a shielding layer.

4. The license plate sheet according to claim 1, wherein the marking layer is at least partially surrounded by a toning layer.

5. The license plate according to claim 1, further comprising a toning layer, wherein the toning layer is transmissive to infrared rays, and a color difference ΔE*ab between the toning layer and the marking layer is between 0 and less than 10.

6. A license plate laminate comprising the license plate sheet according to claim 1, and further comprising a base plate, wherein the license plate sheet is disposed on at least a portion of the base plate.

7. The license plate laminate according to claim 6, wherein an adhesive strength between the base plate and the license plate sheet is at least 5 N/25 mm.

8. A license plate formed with the license plate laminate according to claim 6.

9. The license plate of claim 8, further comprising at least one of an embossed portion, a debossed portion, or a combination thereof.

10. A retroreflective article comprising:
a retroreflective substrate including a plurality of retroreflective elements; and
a marking layer disposed on at least a portion of the retroreflective substrate, wherein the marking layer comprises cesium tungsten oxide particles.

11. The retroreflective article of claim 10, further including at least one of a reflective layer and an air interface.

\* \* \* \* \*

UNITED STATES PATENT AND TRADEMARK OFFICE
CERTIFICATE OF CORRECTION

PATENT NO. : 10,406,998 B2
APPLICATION NO. : 14/409067
DATED : September 10, 2019
INVENTOR(S) : Akira Muramoto Page 1 of 1

It is certified that error appears in the above-identified patent and that said Letters Patent is hereby corrected as shown below:

In the Specification

Column 3
Line 62, delete "radtiation" and insert -- radiation --, therefor.

Column 5
Line 16, delete "doward" and insert -- downward --, therefor.

Column 5
Line 47, after "5" insert -- . --.

Column 17
Line 25, delete "GreytagMacbeth" and insert -- GretagMacbeth --, therefor.

Column 18
Line 31, delete "fo" and insert -- to --, therefor.

Column 19
Line 38, after "trimmed" insert -- . --.

Column 23
Line 55, after "2A" insert -- . --.

Signed and Sealed this
Seventh Day of April, 2020

Andrei Iancu
*Director of the United States Patent and Trademark Office*